(12) United States Patent
Wittek et al.

(10) Patent No.: US 7,678,432 B2
(45) Date of Patent: Mar. 16, 2010

(54) LIQUID-CRYSTALLINE MEDIUM

(75) Inventors: Michael Wittek, Darmstadt (DE); Brigitte Schuler, Grossostheim (DE); Elvira Montenegro, Weinheim (DE)

(73) Assignee: Merck Patent GmbH, Darmstadt (DE)

( * ) Notice: Subject to any disclaimer, the term of this patent is extended or adjusted under 35 U.S.C. 154(b) by 58 days.

(21) Appl. No.: 11/907,326

(22) Filed: Oct. 11, 2007

(65) Prior Publication Data

US 2008/0088789 A1    Apr. 17, 2008

(30) Foreign Application Priority Data

Oct. 12, 2006    (DE)    ........................ 10 2006 048 273

(51) Int. Cl.
*C09K 19/12*    (2006.01)
*C09K 19/30*    (2006.01)
*C09K 19/34*    (2006.01)

(52) U.S. Cl. .............. 428/1.1; 252/299.61; 252/299.63; 252/299.66

(58) Field of Classification Search .................. 428/1.1; 252/299.61, 299.63, 299.66, 299.67
See application file for complete search history.

(56) References Cited

U.S. PATENT DOCUMENTS 7,125,589 B1    10/2006    Kimura et al.

2004/0006235 A1    1/2004    Pauluth et al.
2005/0279968 A1    12/2005    Manabe et al.
2006/0216754 A1    9/2006    Pauluth et al.
2007/0237907 A1    10/2007    Manabe et al.

FOREIGN PATENT DOCUMENTS

| DE | 102006019812 A1 | 11/2006 |
|----|----|----|
| EP | 1346995 A | 9/2003 |
| EP | 1352886 A | 10/2003 |
| EP | 07018810 R | 12/2008 |
| GB | 2240778 A | 8/1991 |
| WO | 9009420 A | 8/1990 |
| WO | 2004035710 A | 4/2004 |

*Primary Examiner*—Shean C Wu
(74) *Attorney, Agent, or Firm*—Millen, White, Zelano, Branigan, P.C.

(57) ABSTRACT

The invention relates to a liquid-crystalline medium, characterized in that it comprises one or more compounds of the formula I

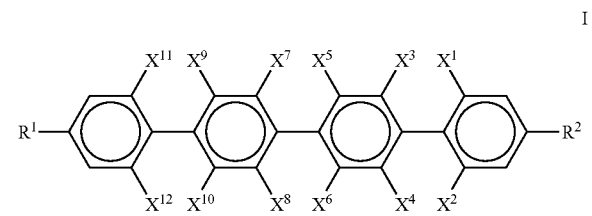

in which $R^1$, $R^2$ and $X^{1-12}$ have the meanings indicated in Claim 1.

27 Claims, No Drawings

LIQUID-CRYSTALLINE MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKI-GUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:
- extended nematic phase range (in particular down to low temperatures)
- switchability at extremely low temperatures (outdoor use, automobiles, avionics)
- increased resistance to UV radiation (longer life)
- low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD-TVs, monitors, PDAs, notebooks, games consoles), a significant reduction in the response times is desired. This requires LC media having very low rotational viscosities. However, the compounds used in the prior art for reducing the rotational viscosity frequently cause an undesired lowering of the clearing point and a reduction in the birefringence of the LC media.

According to one aspect, the invention provides media, in particular for MLC, TN or STN displays, which do not exhibit the disadvantages mentioned above or only do so to a lesser extent, and preferably have fast response times and low rotational viscosities at the same time as a high clearing point and high birefringence. In addition, the LC media should have high dielectric anisotropy and a low threshold voltage.

In accordance with the invention, there is provided LC media comprising one or more compounds of the formula I. The compounds of the formula I result in mixtures having the desired properties indicated above.

The invention relates to a liquid-crystalline medium, characterised in that it comprises one or more compounds of the formula I

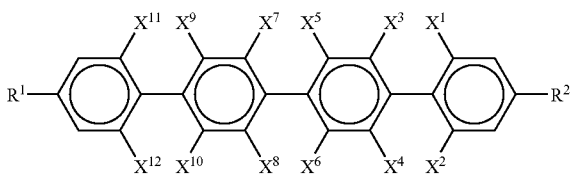

I in which
R$^1$ and R$^2$ each, independently of one another, denote a halogenated or unsubstituted alkyl or alkoxy radical having 1 to 15 C atoms, where, in addition, one or more CH$_2$ groups in these radicals may each, independently of one another, be replaced by —C≡C—, —CF$_2$O—, —CH=CH—,

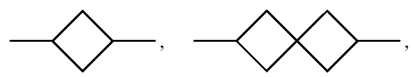

—O—, —CO—O— or —O—CO— in such a way that O atoms are not linked directly to one another, and X$^{1-12}$ each, independently of one another, denote H or F, where at least one of the radicals X$^{1-12}$ denotes F.

Surprisingly, it has been found that the compounds of the formula I have an advantageous rotational viscosity (γ)/clearing point ratio. They are therefore particularly suitable for achieving liquid-crystal mixtures of low γ and high clearing point. In addition, the compounds of the formula I exhibit high birefringence and good LC phase properties, such as, for example, comparatively low melting points, broad nematic phases, narrow or no smectic phases and good low-temperature stability (LTS) with a low tendency to crystallise out of the LC mixture at low temperatures. LC media according to the invention comprising compounds of the formula I have a low rotational viscosity, fast response times, a relatively high clearing point, high LTS, high positive dielectric anisotropy, high birefringence and a broad nematic phase range. They are therefore particularly suitable for TV and video applications. The use of the substantially dielectrically neutral compounds of the formula I also reduces the occurrence of ionic impurities in the LC media according to the invention and thus reduces associated problems, such as so-called "image sticking". In addition, the compounds of the formula I have a positive effect on the UV stability and voltage holding ratio (HR) in the LC media according to the invention.

The compounds of the formula I have a broad range of applications. Depending on the choice of substituents, they can serve as base materials of which liquid-crystalline media are predominantly composed; however, liquid-crystalline base materials from other classes of compound can also be added to the compounds of the formula I in order, for example, to modify the dielectric and/or optical anisotropy of a dielectric of this type and/or to optimise its threshold voltage and/or its viscosity.

In the pure state, the compounds of the formula I are colourless and form liquid-crystalline mesophases in a temperature range which is favourably located for electro-optical use. They are stable chemically, thermally and to light.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

Particular preference is given to compounds of the formula I in which
- X$^2$, X$^4$, X$^6$, X$^8$, X$^{10}$ and X$^{12}$ denote H,
- X$^3$ and X$^5$ do not simultaneously denote F,
- X$^7$ and X$^9$ do not simultaneously denote F,
- one, two or three of the radicals X$^1$, X$^3$, X$^5$, X$^7$, X$^9$ and X$^{11}$ denote F,
- not more than two of the radicals X$^1$, X$^5$ and X$^9$ denote F,
- not more than two of the radicals X$^3$, X$^7$ and X$^{11}$ denote F,
- one of the radicals X$^1$, X$^5$ and X$^9$ and one of the radicals X$^3$, X$^7$ and X$^{11}$ denote F, where these radicals are not located on the same phenyl ring,
- two of the radicals X$^1$, X$^5$ and X$^9$ or two of the radicals X$^3$, X$^7$ and X$^{11}$ denote F.

Particularly preferred compounds of the formula I are those of the following sub-formulae:

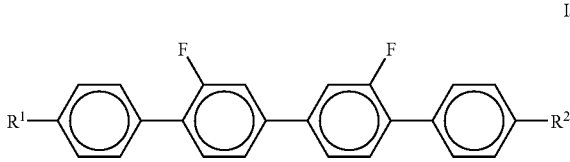

Ia

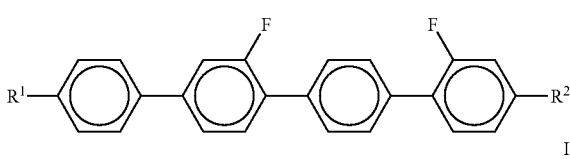

Ib

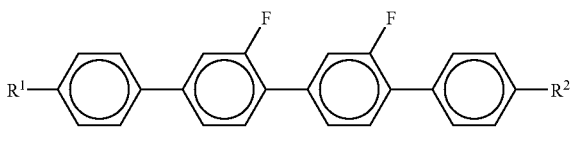

Ic in which R¹ and R² have the meaning indicated in formula I. R¹ and R² preferably denote straight-chain alkyl having 1 to 8 C atoms.

Further preferred embodiments are indicated below:

The medium additionally comprises one or more compounds of the formulae II and/or III:

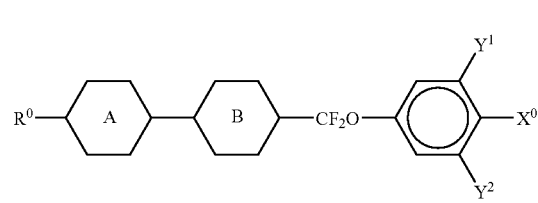

II

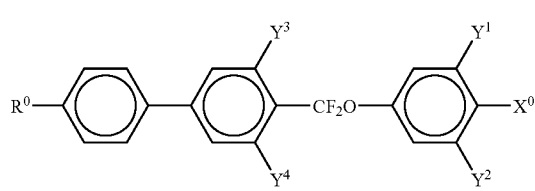

III in which $Y^{1-4}$ each, independently of one another, denote H or F, $R^0$ denotes a halogenated or unsubstituted alkyl or alkoxy radical having 1 to 15 C atoms, where, in addition, one or more $CH_2$ groups in these radicals may each, independently of one another, be replaced by —C≡C—, —$CF_2$O—, —CH=CH—,

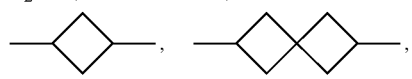

—O—, —CO—O— or —O—CO— in such a way that O atoms are not linked directly to one another, $X^0$ denotes F, Cl, CN, $SF_5$, SCN, NCS, a halogenated alkyl radical having up to 6 C atoms, a halogenated alkenyl radical having up to 6 C atoms, a halogenated alkoxy radical having up to 6 C atoms, or a halogenated alkenyloxy radical having up to 6 C atoms, and

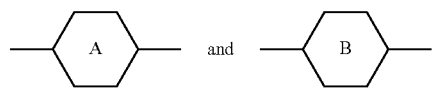

each, independently of one another, denote

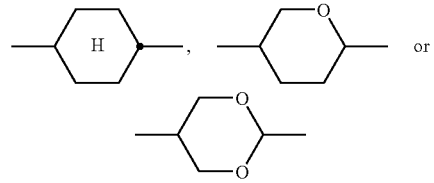

If $R^0$, $R^1$, and/or $R^2$ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If $R^0$, $R^1$, and/or $R^2$ in the formulae above and below denotes an oxaalkyl, the oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8-, or 9-oxadecyl.

If $R^0$, $R^1$, and/or $R^2$ in the formulae above and below denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6-, or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^0$, $R^1$, and/or $R^2$ in the formulae above and below denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the c-position.

In the formulae above and below, $X^0$ is preferably F, Cl or mono- or polyfluorinated alkyl or alkoxy having 1, 2 or 3 C atoms or mono- or polyfluorinated alkenyl having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, very particularly preferably F or $OCF_3$.

The compounds of the formula II are preferably selected from the following formulae:

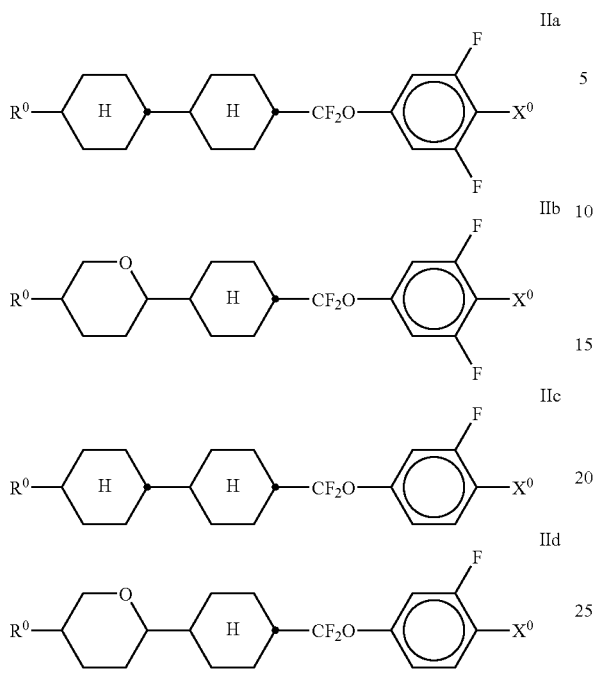

in which R⁰ and X⁰ have the meanings indicated above. Preferably, R⁰ denotes alkyl having 1 to 8 C atoms, and X⁰ denotes F. Particular preference is given to compounds of the formulae IIa and IIb;

The compounds of the formula III are preferably selected from the following formulae:

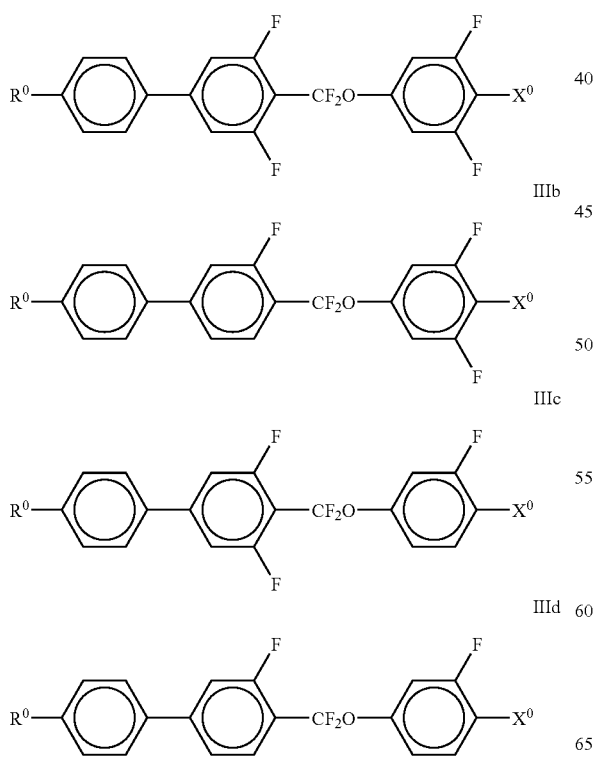

in which R⁰ and X⁰ have the meanings indicated above. Preferably, R⁰ denotes alkyl having 1 to 8 C atoms, and X⁰ denotes F. Particular preference is given to compounds of the formula IIIa;

The medium additionally comprises one or more compounds selected from the following formulae:

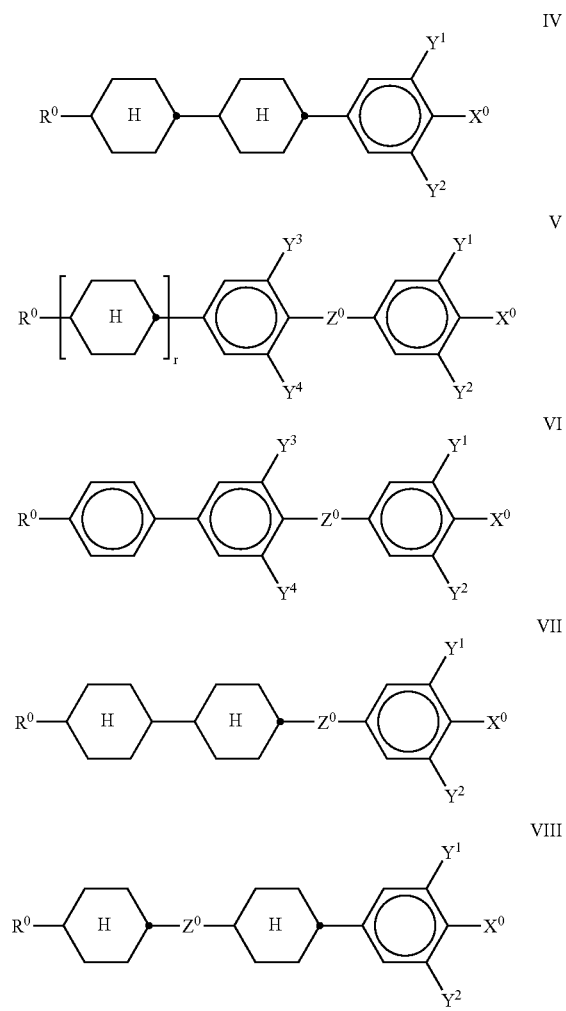

in which R⁰, X⁰ and $Y^{1-4}$ have the meanings indicated in formulae II and III, Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—, and r denotes 0 or 1;

The compounds of the formula IV are preferably selected from the following formulae:

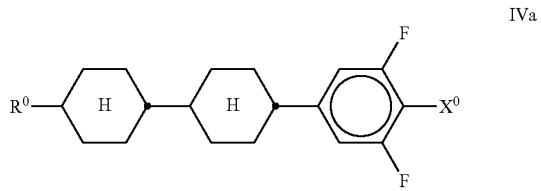

-continued

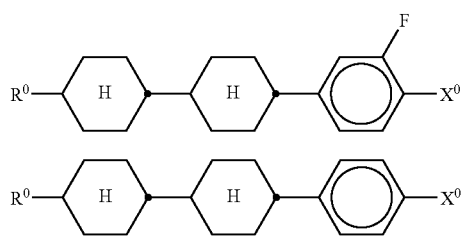

in which R⁰ and X⁰ have the meanings indicated above. Preferably, R⁰ denotes alkyl having 1 to 8 C atoms, and X⁰ denotes F or OCF₃;

The compounds of the formula V are preferably selected from the following formulae:

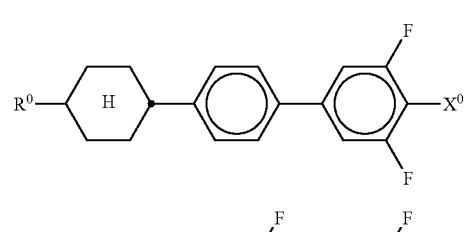

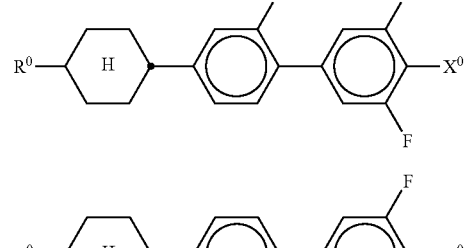

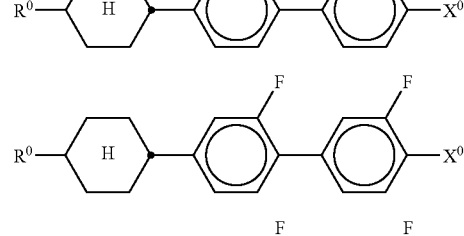

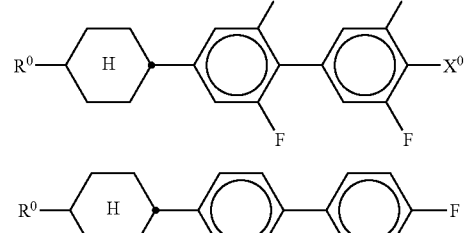

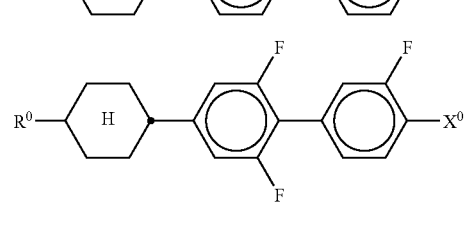

in which R⁰ and X⁰ have the meanings indicated above. Preferably, R⁰ denotes alkyl having 1 to 8 C atoms, and X⁰ denotes F;

The compounds of the formula VI are preferably selected from the following formulae:

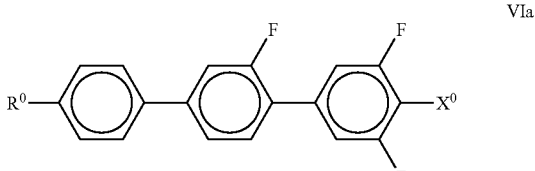

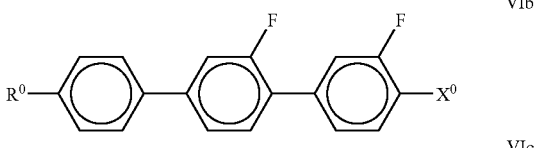

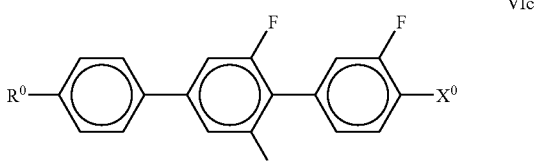

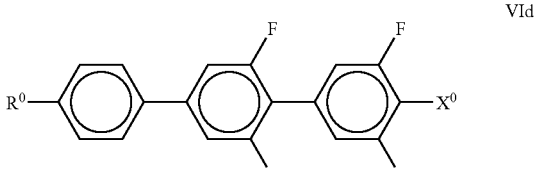

in which R⁰ and X⁰ have the meanings indicated above. Preferably, R⁰ denotes alkyl having 1 to 8 C atoms, and X⁰ denotes F;

The compounds of the formula VII are preferably selected from the following formulae:

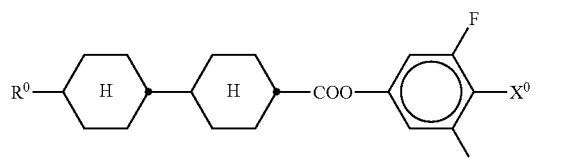

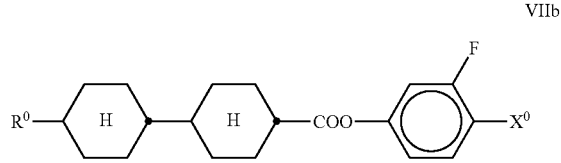

in which R⁰ and X⁰ have the meanings indicated above. Preferably, R⁰ denotes alkyl having 1 to 8 C atoms, and X⁰ denotes F;

The medium comprises one or more compounds selected from the following formulae:

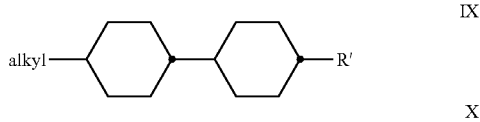

-continued

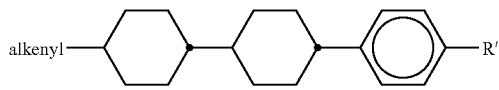
XI

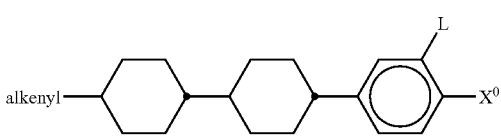
XII in which X⁰ has the meaning indicated above,
L denotes H or F,
"alkyl" denotes $C_{1-7}$-alkyl,
R' denotes $C_{1-7}$-alkyl, $C_{1-6}$-alkoxy or $C_{2-7}$-alkenyl, and
"alkenyl" and "alkenyl*" each, independently of one another, denote $C_{2-7}$-alkenyl.

The compounds of the formulae IX-XII are preferably selected from the following formulae:

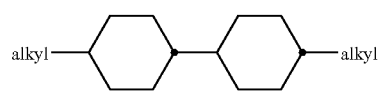
IXa

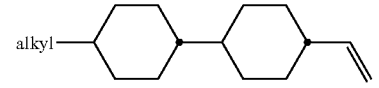
IXb

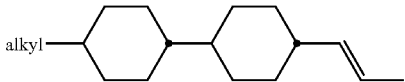
IXc

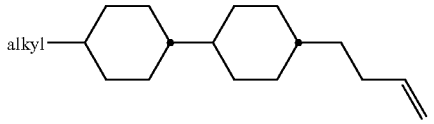
IXd

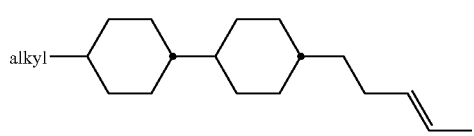
IXe

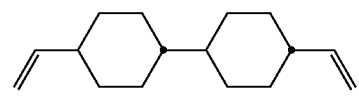
Xa

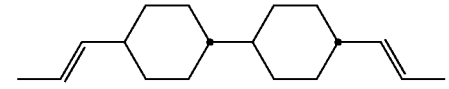
Xb

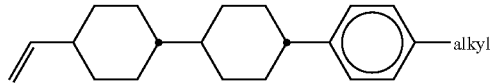
XIa

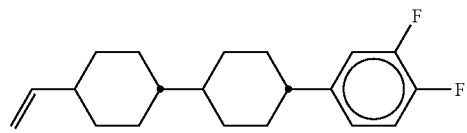
XIIa in which "alkyl" has the meaning indicated above;
the medium additionally comprises one or more compounds selected from the following formulae:

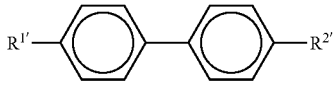
XIII

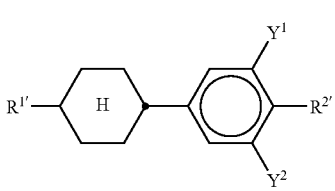
XIV in which $Y^{1,2}$ have the meanings indicated above, and $R^{1'}$ and $R^{2'}$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms;

the medium comprises one or more compounds of the formula XIII in which at least one of the radicals $R^{1'}$ and $R^{2'}$ denotes alkenyl having 2 to 7 C atoms, preferably those selected from the following formulae:

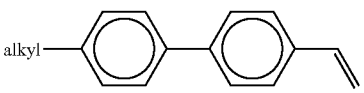
XIIIa

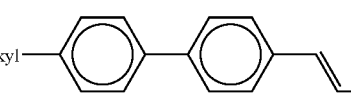
XIIIb

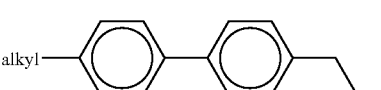
XIIIc

XIIId in which "alkyl" has the meaning indicated above;
the medium comprises one or more compounds of the following formulae:

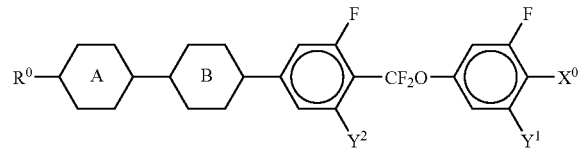
XV

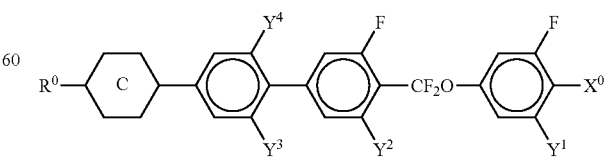
XVI in which $R^0$, $X^0$ and $Y^{1-4}$ have the meanings indicated in formulae II and III,

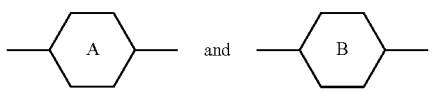

each, independently of one another, denote

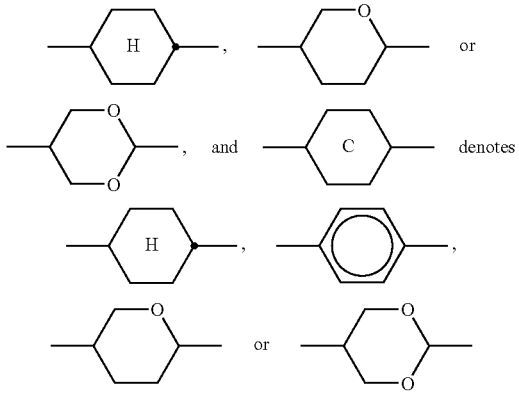

the compounds of the formulae XV and XVI are preferably selected from the following formulae:

XVa
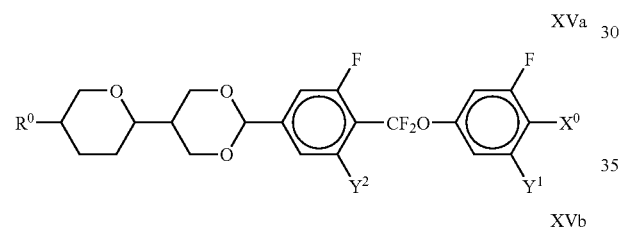

XVb

XVc

XVd

XVIa
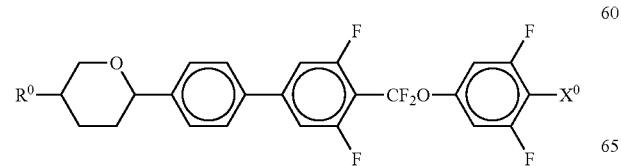

XVIb
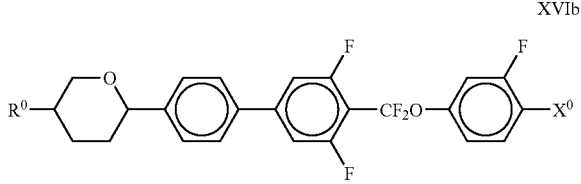

XVIc
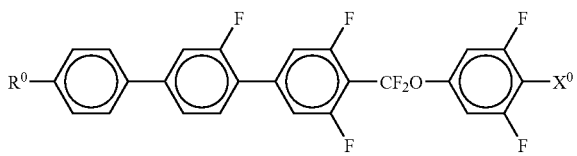

XVId
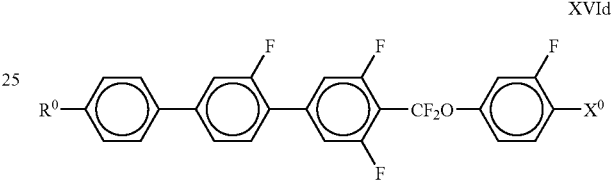

in which $R^0$ and $X^0$ have the meanings indicated above. Preferably, $R^0$ denotes alkyl having 1 to 8 C atoms, and $X^0$ denotes F. Particularly preferred compounds of the formulae XV and XVa-XVd are those in which $Y^1$ denotes F and $Y^2$ denotes H or F, preferably F;

the medium comprises one or more compounds of the following formula:

XVII
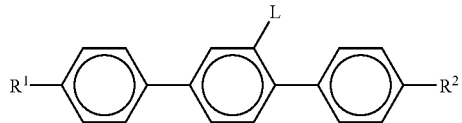

in which $R^1$ and $R^2$ have the meanings defined in formula I, and preferably each, independently of one another, denote alkyl having 1 to 8 C atoms, and L denotes H or F;

the medium comprises one or more compounds of the following formula:

XVIII
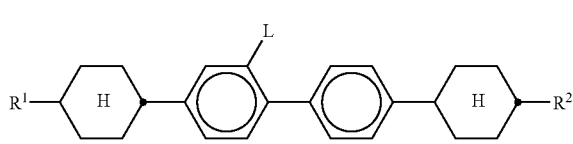

in which $R^1$ and $R^2$ have the meanings defined in formula I, and preferably each, independently of one another, denote alkyl having 1 to 8 C atoms, and L denotes H or F;

the medium additionally comprises one or more compounds selected from the following formulae:

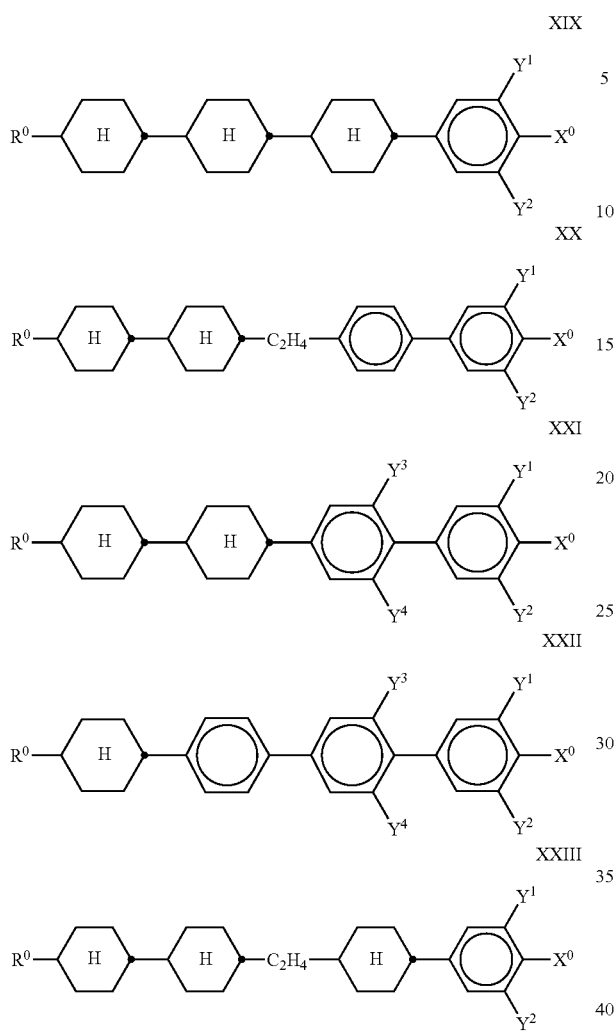

XIX

XX

XXI

XXII

XXIII

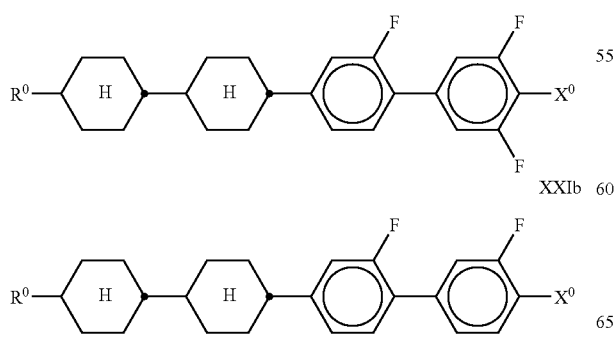

XXIa

XXIb in which $R^0$ and $X^0$ each, independently of one another, have one of the meanings indicated above, and $Y^{1-4}$ each, independently of one another, denote H or F, $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

The compounds of the formula XXI are preferably selected from the following formulae:

in which $R^0$ and $X^0$ have the meanings indicated above. Preferably, $R^0$ denotes alkyl having 1 to 8 C atoms, and $X^0$ denotes F;

the medium additionally comprises one or more compounds selected from the following formula:

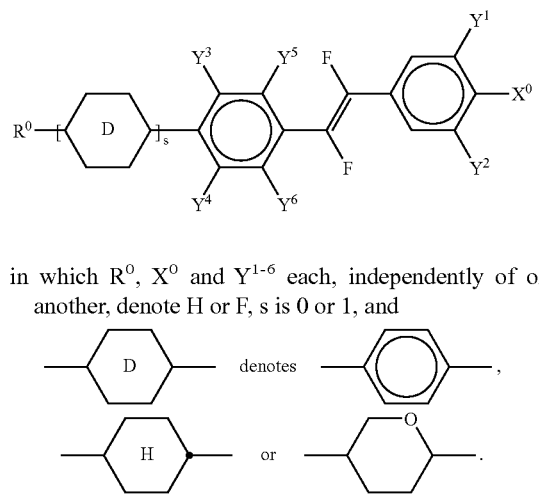

XXIV in which $R^0$, $X^0$ and $Y^{1-6}$ each, independently of one another, denote H or F, s is 0 or 1, and

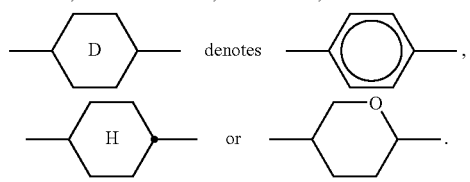

Preferably, $R^0$ denotes alkyl having 1 to 8 C atoms, and $X^0$ denotes F;

the compounds of the formula XXIV are preferably selected from the following formulae:

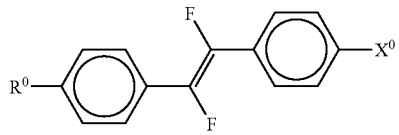

XXIVa

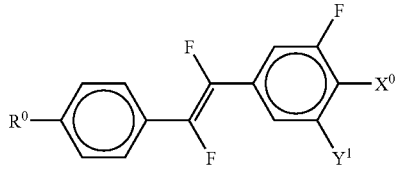

XXIVb

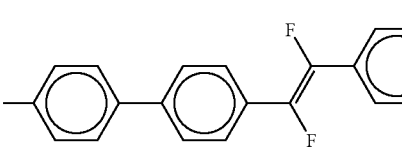

XXIVc

XXIVd

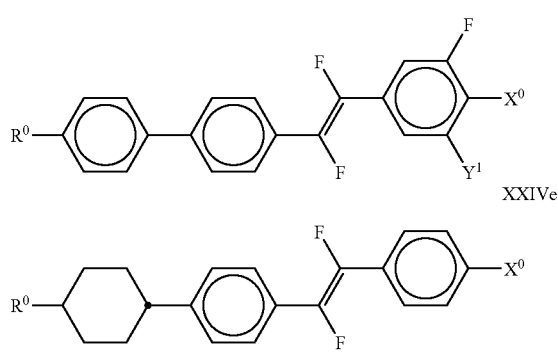

XXIVe

-continued

XXIVf

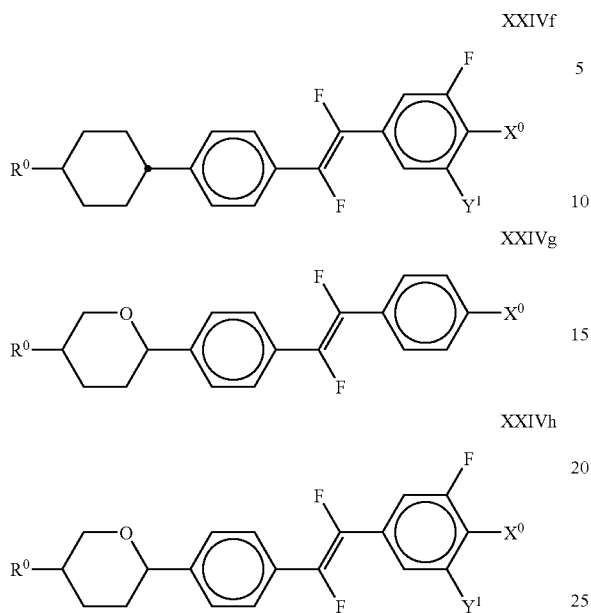

XXIVg

XXIVh in which $R^0$, $X^0$ and $Y^1$ have the meanings indicated above. Preferably, $R^0$ denotes alkyl having 1 to 8 C atoms, $X^0$ denotes F, and $Y^1$ denotes F;

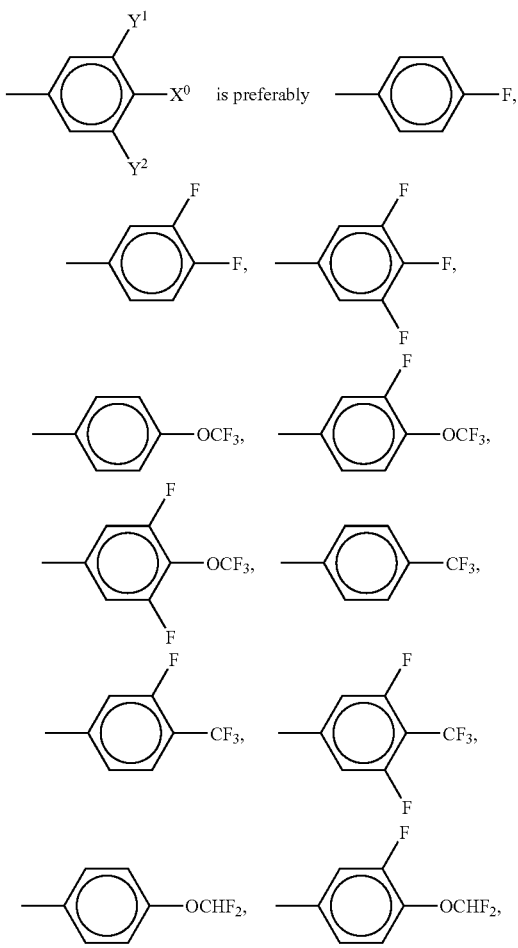

-continued

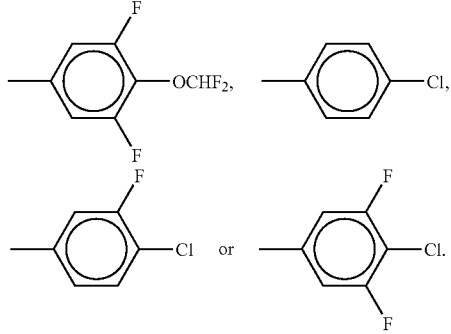

$R^0$ is straight-chain alkyl or alkenyl having 2 to 7 C atoms; $X^0$ is F;

the medium comprises one, two or more compounds of the formula I, in particular of the formula Ia, Ib or Ic;

the medium comprises 1-30% by weight, preferably 2-20% by weight, particularly preferably 2-15% by weight, of compounds of the formula I;

the medium comprises compounds selected from the formulae I, II, III, IV, VI, IX-XIII and XXI;

the proportion of compounds of the formulae II, III, IV, VI, IX-XIII and XXI in the mixture as a whole is 40 to 95% by weight;

the medium comprises 10-50% by weight, particularly preferably 12-40% by weight, of compounds of the formulae II and/or III;

the medium comprises 20-70% by weight, particularly preferably 25-65% by weight, of compounds of the formulae IX-XIII;

the medium comprises 4-30% by weight, particularly preferably 5-20% by weight, of compounds of the formula IV;

the medium comprises 2-30% by weight, particularly preferably 3-20% by weight, of compounds of the formula VI;

the medium comprises 2-30% by weight, particularly preferably 2-25% by weight, of compounds of the formula XXI.

It has been found that even a relatively small proportion of compounds of the formula I mixed with conventional liquid-crystal materials, but in particular with one or more compounds of the formulae II to XXIV, results in a significant increase in the light stability and in low birefringence values, with broad nematic phases with low smectic-nematic transition temperatures being observed at the same time, improving the shelf life. At the same time, the mixtures exhibit very low threshold voltages and very good values for the VHR on exposure to UV.

The term "alkyl" or "alkyl*" encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae II to VIII (preferably II, III, IV and V, in particular II and IIIa), in which $X^0$ denotes F, $OCF_3$, $OCHF_2$, OCH=$CF_2$, OCF=$CF_2$ or $OCF_2$—$CF_2H$. A favourable synergistic action with the compounds of the formula I results in particularly advantageous properties. In particular, mixtures comprising compounds of the formulae I, IIa and IIIa are distinguished by their low threshold voltage.

The individual compounds of the above-mentioned formulae and the sub-formulae thereof which can be used in the media according to the invention are either known or can be prepared analogously to the known compounds.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and low-Δn TFT applications, such as, for example, mobile telephones and PDAs.

The liquid-crystal mixtures according to the invention, while retaining the nematic phase down to −20° C. and preferably down to −30° C., particularly preferably down to −40° C., and a clearing point of ≧70° C., preferably ≧75° C., at the same time allow rotational viscosities $\gamma_1$ of ≦90 mPa·s, particularly preferably ≦60 mPa·s, to be achieved, enabling excellent MLC displays having fast response times to be achieved.

The dielectric anisotropy Δ∈ of the liquid-crystal mixtures according to the invention is preferably ≧+3, particularly preferably ≧+6. In addition, the mixtures are characterised by low operating voltages. The threshold voltage of the liquid-crystal mixtures according to the invention is preferably ≦1.6 V. The birefringence Δn of the liquid-crystal mixtures according to the invention is preferably ≧0.08, particularly preferably ≧0.09, and preferably ≦0.14, particularly preferably ≦0.12.

The nematic phase range of the liquid-crystal mixtures according to the invention preferably has a width of at least 90°, in particular at least 100°. This range preferably extends at least from −25° to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher Δ∈ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyano-phenylcyclohexanes of the formula

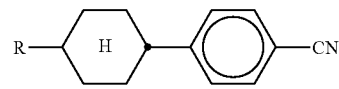

or esters of the formula

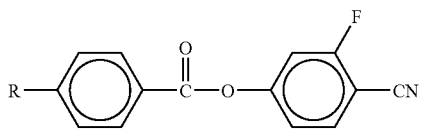

instead of the compounds of the formula I.

The light stability and UV stability of the mixtures according to the invention are considerably better, i.e. they exhibit a significantly smaller decrease in the HR on exposure to light or UV. Even low concentrations of the compounds (<2% by weight) of the formula I in the mixtures increase the HR by 6% or more compared with mixtures from the prior art.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXIV or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable stabilisers and dopants are mentioned below in Tables C and D.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively; n and m are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |

-continued

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.

TABLE A

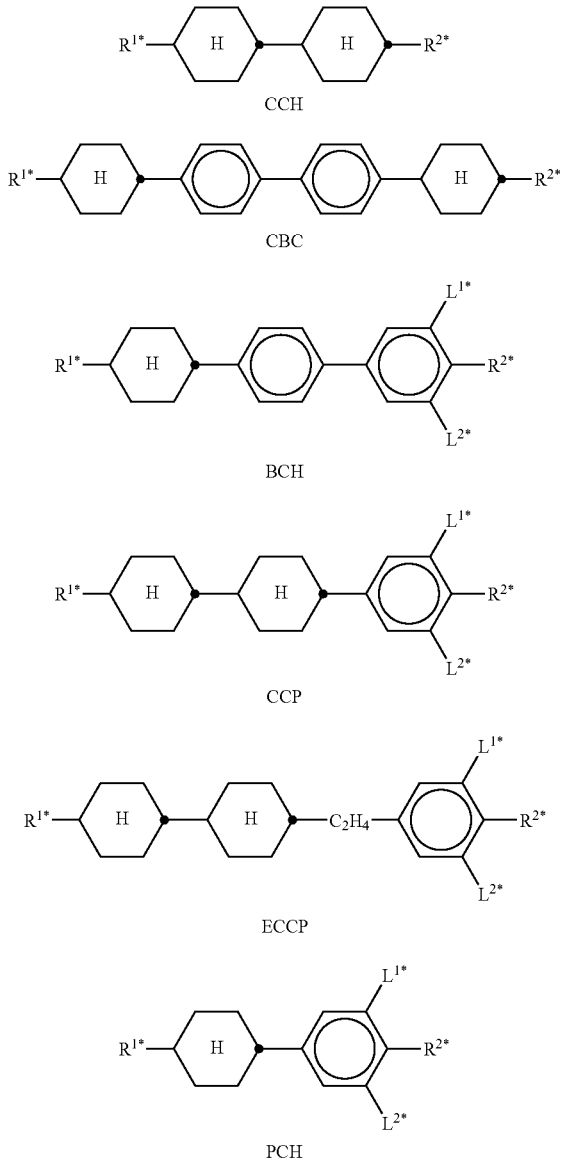

TABLE B

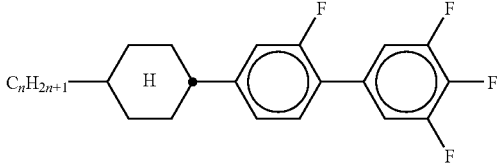

CGU-n-F

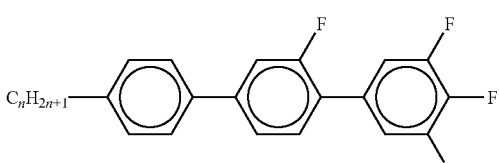

PGU-n-F

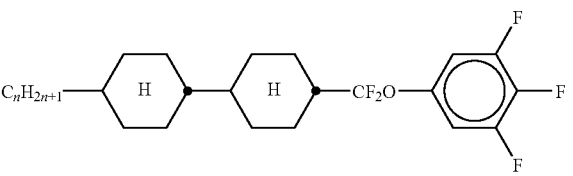

CCQU-n-F

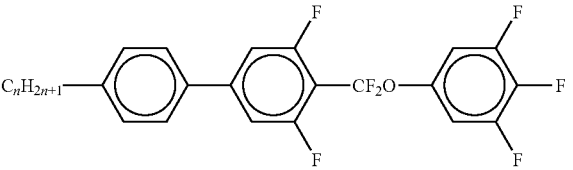

PUQU-n-F

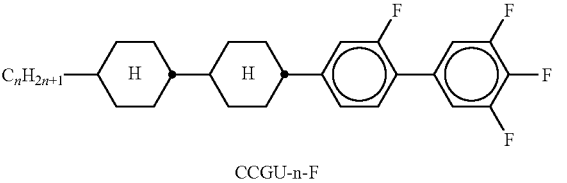

CCGU-n-F

TABLE B-continued

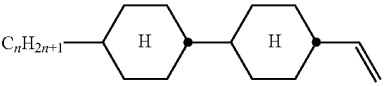

CC-n-V

PGP-n-m

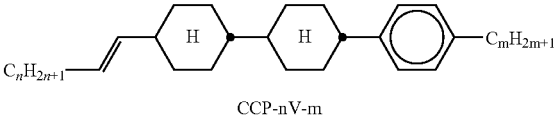

CCP-nV-m

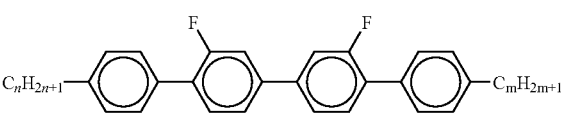

PGIGP-n-m

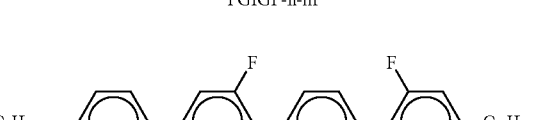

PGPGI-n-m

Particular preference is given to liquid-crystalline mixtures which, besides the compounds of the formula I, comprise at least one, two, three, four or more compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight of dopants.

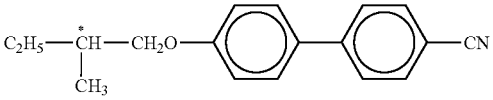

C 15

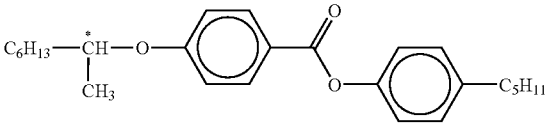

CM 21

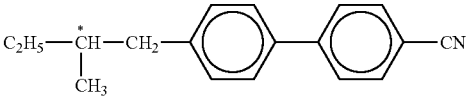

CB 15

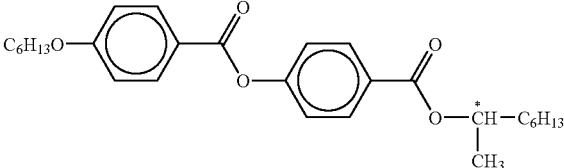

R/S-811

TABLE C-continued
Table C indicates possible dopants which are generally added to the mixtures according to the invention. The mixtures preferably comprise 0-10% by weight, in particular 0.01-5% by weight and particularly preferably 0.01-3% by weight of dopants.
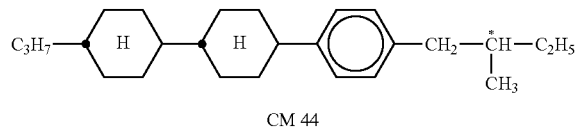
CM 44
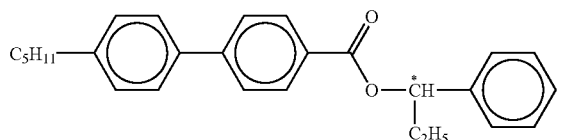
CM 45
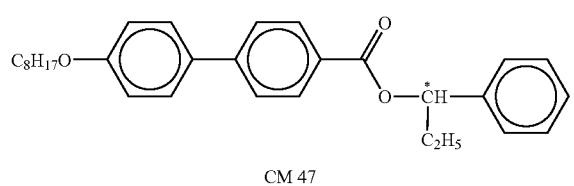
CM 47
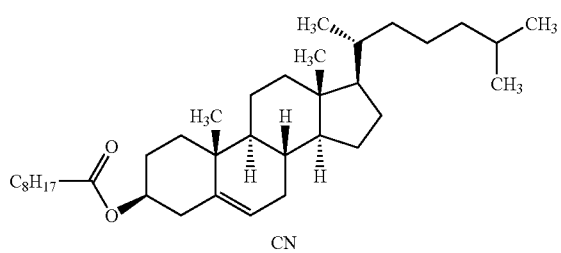
CN
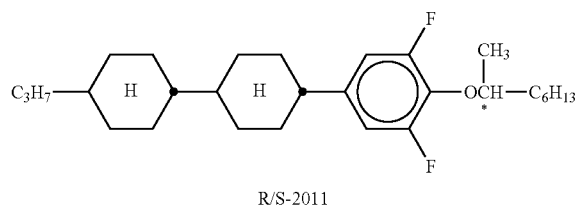
R/S-2011
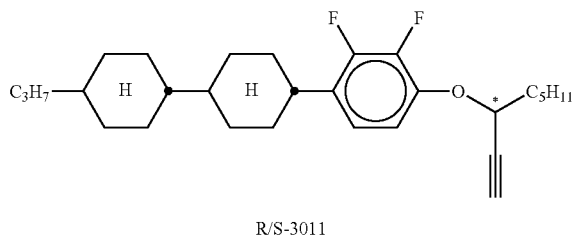
R/S-3011
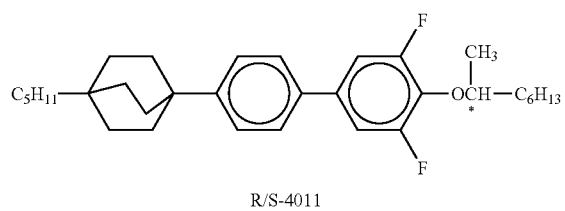
R/S-4011
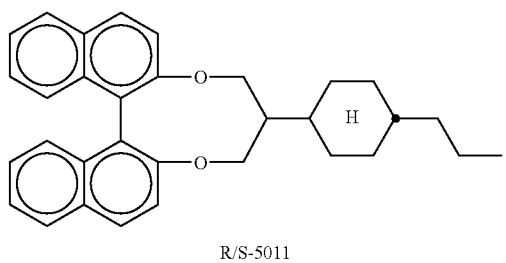
R/S-5011
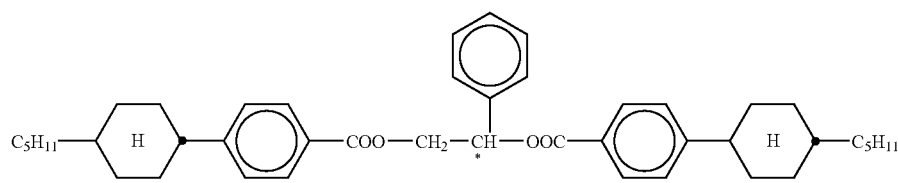
R/S-1011

TABLE D
Stabilisers which can be added, for example, to the mixtures according to the invention in amounts of 0-10% by weight are mentioned below.
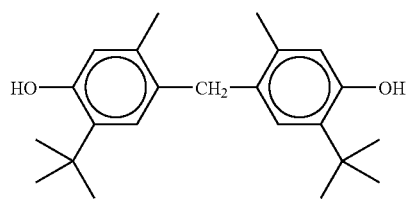
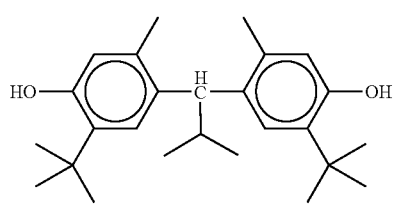
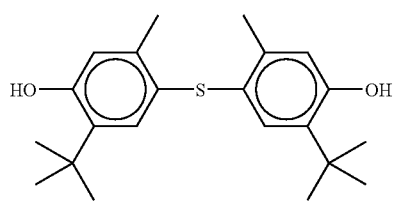
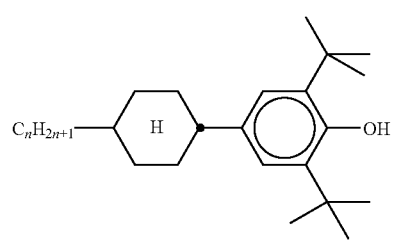
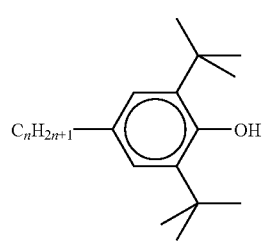
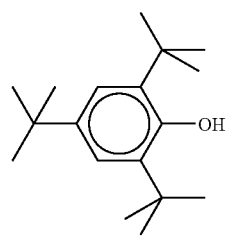
TABLE D-continued
Stabilisers which can be added, for example, to the mixtures according to the invention in amounts of 0-10% by weight are mentioned below.
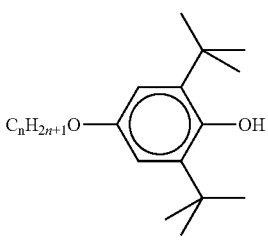
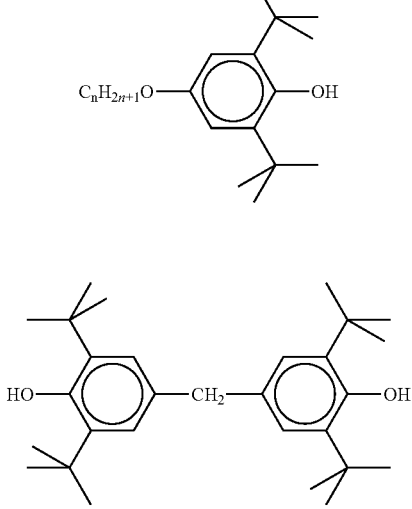
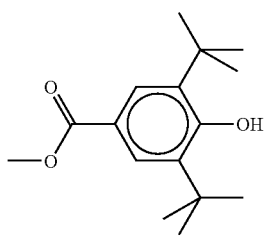
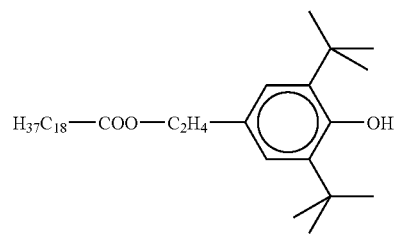
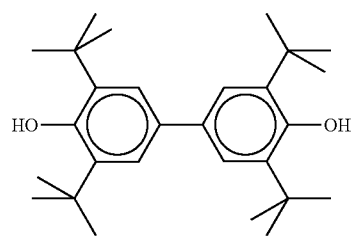

TABLE D-continued
Stabilisers which can be added, for example, to the mixtures according to the invention in amounts of 0-10% by weight are mentioned below.
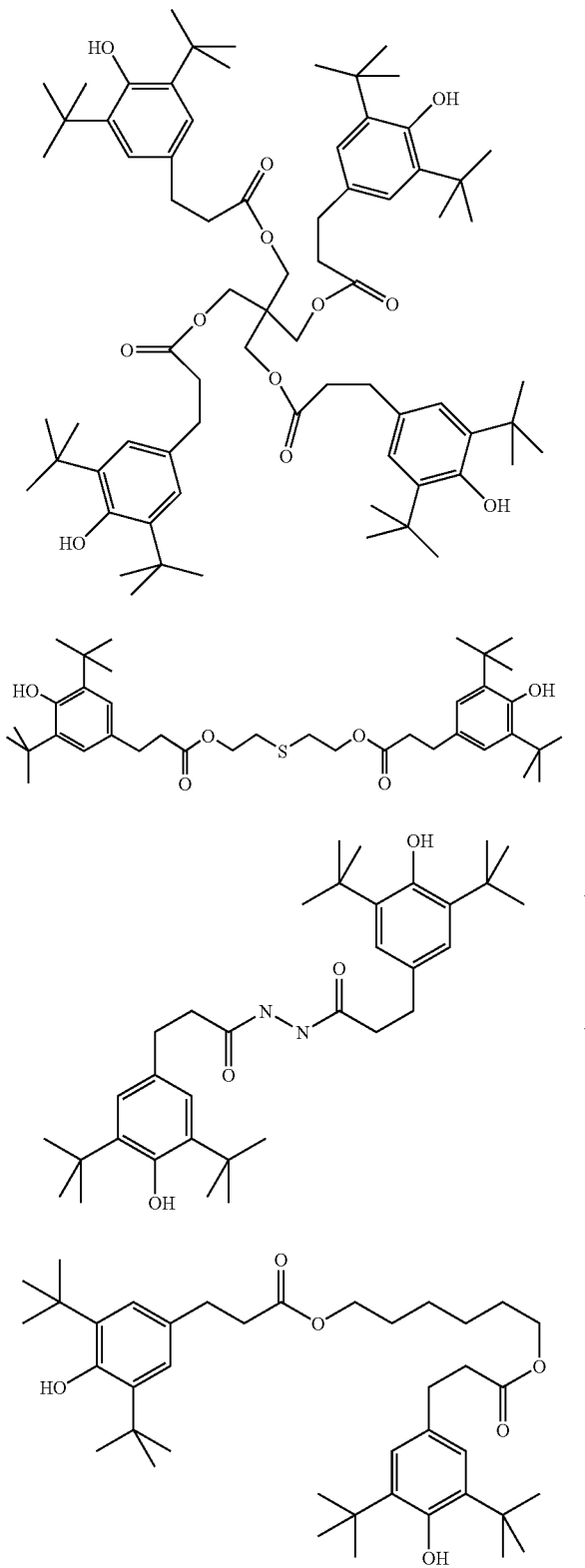
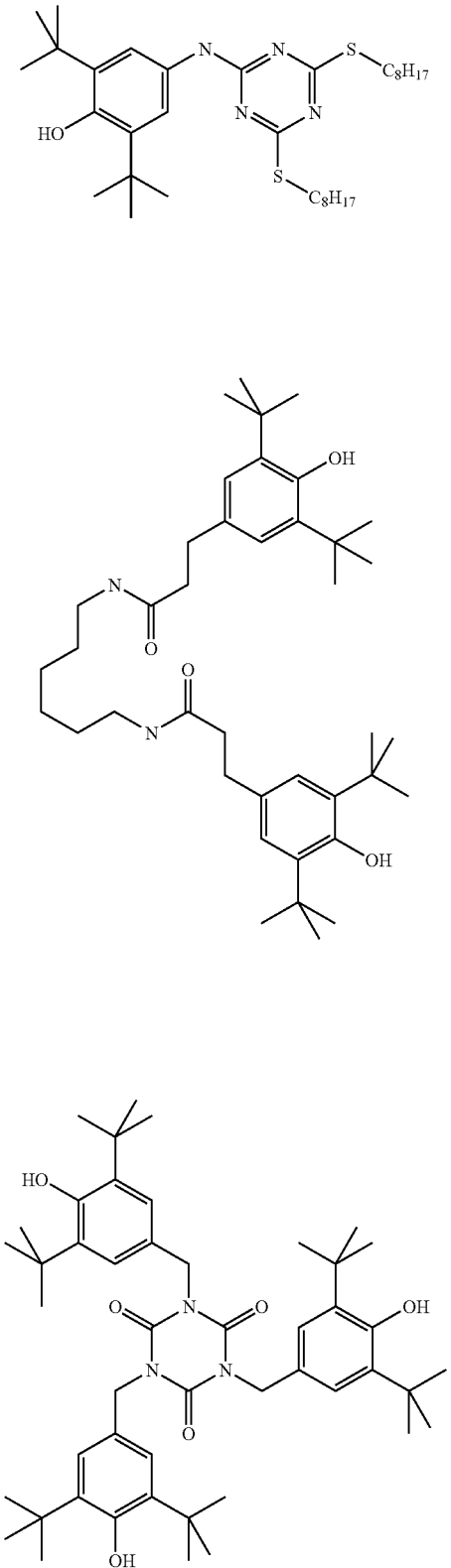

TABLE D-continued
Stabilisers which can be added, for example, to the mixtures according to the invention in amounts of 0-10% by weight are mentioned below.
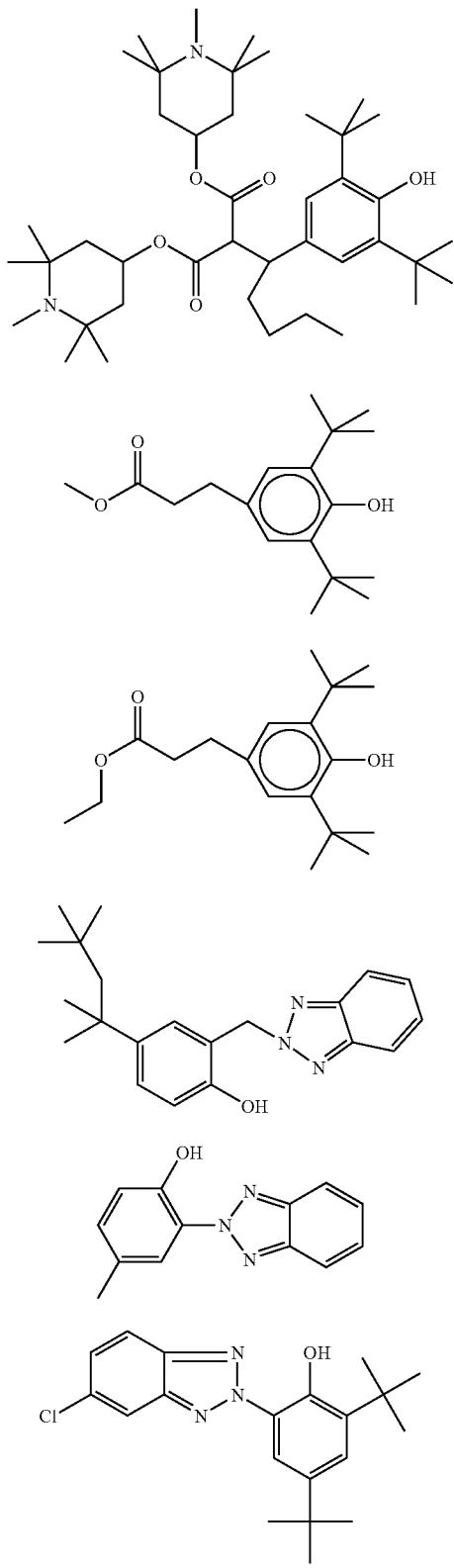
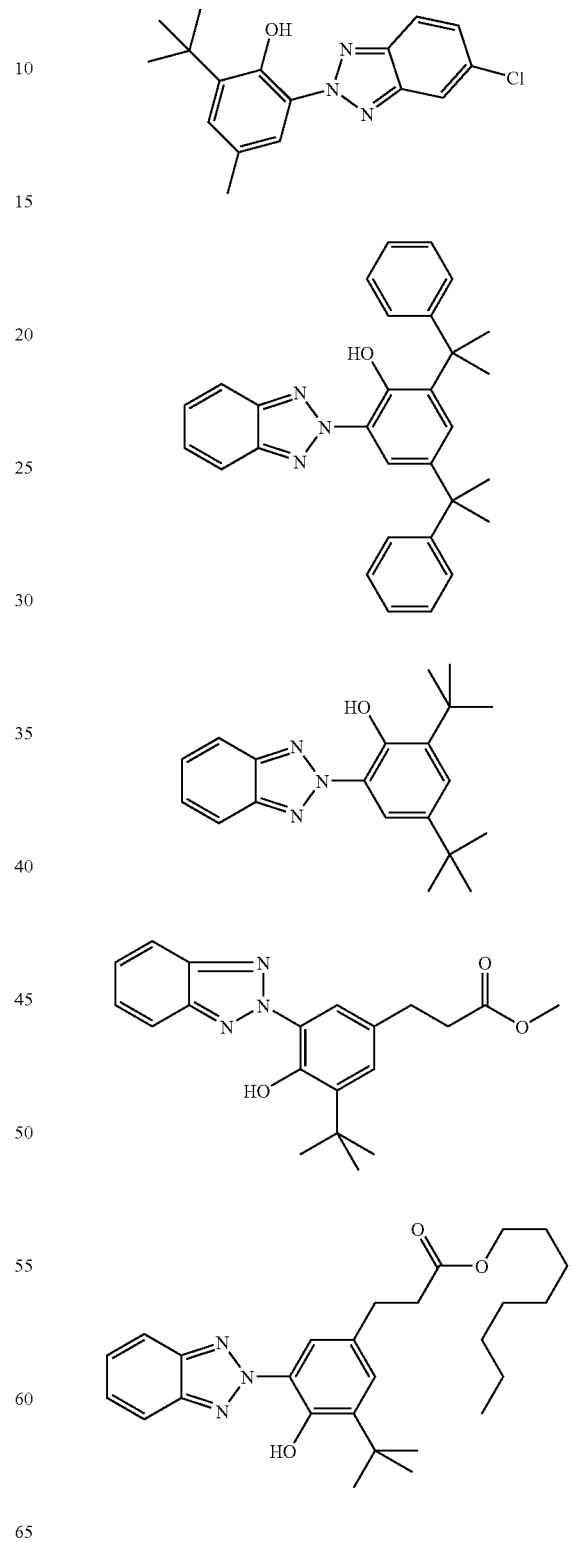

TABLE D-continued

Stabilisers which can be added, for example, to the mixtures according to the invention in amounts of 0-10% by weight are mentioned below.

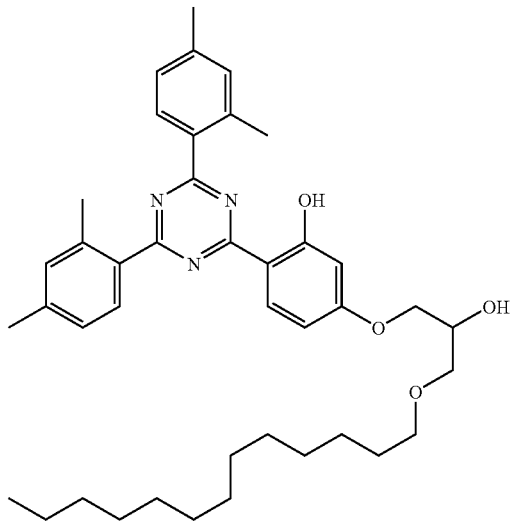

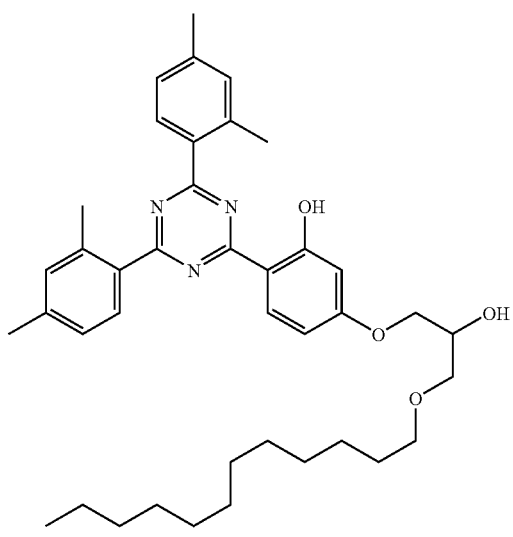

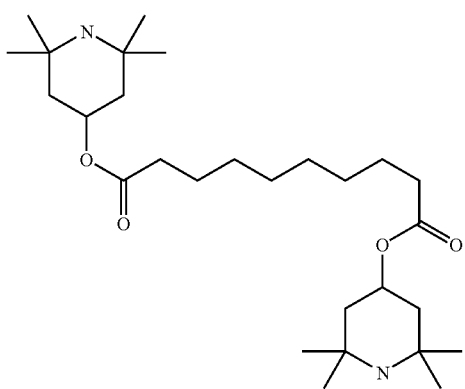

TABLE D-continued

Stabilisers which can be added, for example, to the mixtures according to the invention in amounts of 0-10% by weight are mentioned below.

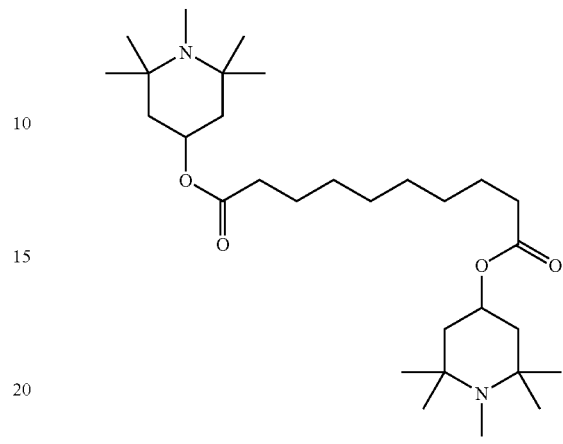

The present invention will now be further described by way of the following non-limiting examples. In applying the disclosure of these examples, it should be kept clearly in mind that other and different embodiments of the methods disclosed according to the present invention will no doubt suggest themselves to those of skill in the relevant art.

In the foregoing and in the following examples, all temperatures are set forth uncorrected in degrees Celsius; and, unless otherwise indicated, all parts and percentages are by weight.

The entire disclosures of all applications, patents and publications, cited above and below, including priority German Patent Application DE 102006048273.5 filed Oct. 12, 2006, are hereby incorporated by reference.

EXAMPLES

The following examples are intended to explain the invention without limiting it.

Above and below, percentage data denote per cent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C., $\gamma_1$ denotes the rotational viscosity (mPa·s) at 20° C., $V_{10}$ denotes the voltage (V) for a 10% change in transmission (viewing angle perpendicular to the plate surface), (threshold voltage), $V_{90}$ denotes the voltage (V) for a 90% change in transmission (viewing angle perpendicular to the plate surface), $\Delta\in$ denotes the dielectric anisotropy at 20° C. and 1 kHz ($\Delta\in=\in_\parallel-\in_\perp$, where $\in_\parallel$ denotes the dielectric constant parallel to the longitudinal axes of the molecules and $\in_\perp$ denotes the dielectric constant perpendicular thereto), HR denotes the voltage holding ratio (%) after exposure to UV and/or heat.

The electro-optical data are measured in a TN cell at the 1st minimum (i.e. at a d·Δn value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals", status November 1997, Merck KGaA, Germany, and apply to a temperature of 20° C., unless explicitly indicated otherwise.

Comparative Example 1

| | | | |
|---|---|---|---|
| CC-3-V | 42.00% | Clearing point [° C.]: | 75.5 |
| CC-3-V1 | 3.50% | Δn [589 nm, 20° C.]: | 0.0996 |
| CCP-20CF3 | 10.00% | Δε [kHz, 20° C.]: | +7.9 |
| PGP-2-4 | 1.00% | γ₁ [mPa·s, 20° C.]: | 66 |
| PUQU-2-F | 9.00% | V₁₀ [V]: | 1.49 |
| PUQU-3-F | 11.00% | V₉₀ [V]: | 2.23 |
| PGU-3-F | 7.00% | | |
| CCGU-3-F | 9.00% | | |
| CBC-33 | 4.50% | | |
| CBC-53 | 3.00% | | |

Comparative Example 2

| | | | |
|---|---|---|---|
| CC-3-V | 39.00% | Clearing point [° C.]: | 74.5 |
| CC-3-V1 | 8.00% | Δn [589 nm, 20° C.]: | 0.0974 |
| CCP-20CF3 | 10.00% | Δε [kHz, 20° C.]: | +7.7 |
| PUQU-2-F | 9.00% | γ₁ [mPa·s, 20° C.]: | 64 |
| PUQU-3-F | 11.00% | V₁₀ [V]: | 1.47 |
| PGU-3-F | 7.00% | V₉₀ [V]: | 2.24 |
| CCGU-3-F | 8.50% | HR [%, 5 min/100° C.]: | 98.8 |
| CBC-33 | 4.00% | | |
| CBC-53 | 3.50% | | |

Example 1

| | | | |
|---|---|---|---|
| CC-3-V | 39.00% | Clearing point [° C.]: | 73.5 |
| CCP-V-1 | 14.00% | Δn [589 nm, 20° C.]: | 0.0999 |
| CCP-30CF3 | 8.00% | Δε [kHz, 20° C.]: | +7.3 |
| PUQU-2-F | 9.00% | γ₁ [mPa·s, 20° C.]: | 59 |
| PUQU-3-F | 11.00% | V₁₀ [V]: | 1.50 |
| PGU-3-F | 6.00% | V₉₀ [V]: | 2.27 |
| CCGU-3-F | 6.00% | | |
| CCQU-3-F | 4.00% | | |
| PGPGI-3-5 | 3.00% | | |

The mixture has lower rotational viscosity than the mixtures from Comparative Examples 1 and 2 at the same time as virtually unchanged values for birefringence, clearing point, dielectric anisotropy and threshold voltage.

Example 2

| | | | |
|---|---|---|---|
| CC-3-V | 37.00% | Clearing point [° C.]: | 75.5 |
| CCP-V-1 | 12.00% | Δn [589 nm, 20° C.]: | 0.1014 |
| CCP-30CF3 | 10.00% | Δε [kHz, 20° C.]: | +7.7 |
| PUQU-2-F | 9.00% | γ₁ [mPa·s, 20° C.]: | 61 |
| PUQU-3-F | 10.00% | V₁₀ [V]: | 1.47 |
| PGU-3-F | 7.00% | V₉₀ [V]: | 2.23 |
| CCGU-3-F | 6.00% | HR [%, 5 min/100° C.]: | 98.8 |
| CCQU-3-F | 6.00% | | |
| PGIGP-3-5 | 3.00% | | |

The mixture has lower rotational viscosity than the mixtures from Comparative Examples 1 and 2 at the same time as virtually unchanged values for birefringence, clearing point, dielectric anisotropy and threshold voltage.

The preceding examples can be repeated with similar success by substituting the generically or specifically described reactants and/or operating conditions of this invention for those used in the preceding examples.

While the invention has been illustrated with respect to the production and of particular compounds, it is apparent that variations and modifications of the invention can be made without departing from the spirit or scope of the invention.

The invention claimed is:

1. A liquid-crystalline medium comprising at least two liquid crystalline compounds, wherein said medium comprises one or more compounds of Formula I

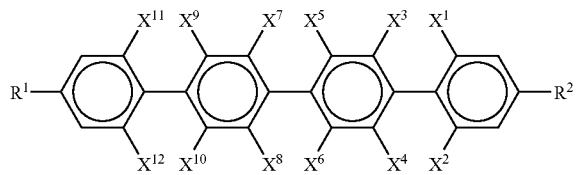

in which $R^1$ and $R^2$ are each, independently of one another, a halogenated or unsubstituted alkyl or alkoxy radical having 1 to 15 C atoms, where, in addition, one or more $CH_2$ groups in these radicals are may each, independently of one another, optionally replaced by —C≡C—, —$CF_2$O—, —CH=CH—

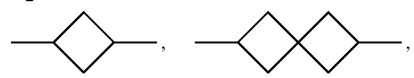

—O—, —CO—O— or —O—CO— in such a way that O atoms are not linked directly to one another, and $X^2, X^4, X^6, X^8, X^{10}$ and $X^{12}$ are each H, $X^1, X^3, X^5, X^7, X^9$ and $X^{11}$ are each, independently of one another, H or F, one or two of the radicals $X^1, X^5$ and $X^9$ are F and one or two of the radicals $X^3$, $X^7$ and $X^{11}$ are F, $X^3$ and $X^5$ are not simultaneously F, and $X^7$ and $X^9$ are not simultaneously F; and wherein said medium further comprises one or more compounds selected from the following formulae:

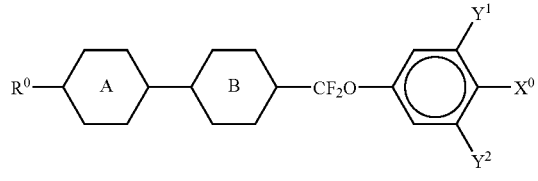

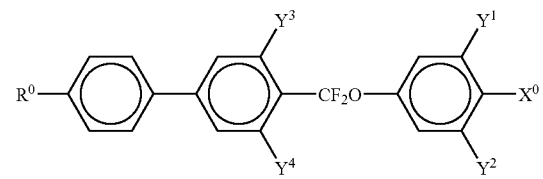

wherein $Y^{1-4}$ are each, independently of one another, H or F, $R^0$ is a halogenated or unsubstituted alkyl or alkoxy radical having 1 to 15 C atoms, where, in addition, one or more $CH_2$ groups in these radicals are each, independently of one another, optionally replaced by —C≡C—, —$CF_2$O—, —CH=CH—,

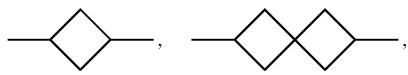

—O—, —CO—O— or —O—CO— in such a way that O atoms are not linked directly to one another, $X^0$ is F, Cl, CN, $SF_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, and

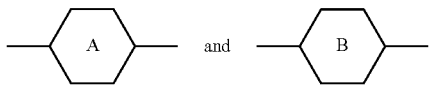

each, independently of one another, are

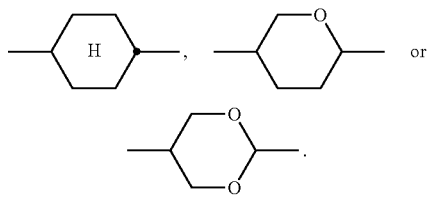

2. A liquid-crystalline medium according to claim 1, wherein one, two or three of $X^1$, $X^3$, $X^5$, $X^7$, $X^9$ and $X^{11}$ are each F.

3. A liquid-crystalline medium according claim 1, wherein not more than two of $X^1$, $X^5$ and $X^9$ are F.

4. A liquid-crystalline medium according to claim 1, wherein not more than two of $X^3$, $X^7$ and $X^{11}$ are F.

5. A liquid-crystalline medium according to claim 1, wherein one of the radicals $X^1$, $X^5$ and $X^9$ is F, and one of the radicals $X^3$, $X^7$ and $X^{11}$ is F, where these radicals are not located on the same phenyl ring.

6. A liquid-crystalline medium according to claim 1, wherein two of $X^1$, $X^5$ and $X^9$ are F, or two of $X^3$, $X^7$ and $X^{11}$ are F.

7. A liquid-crystalline medium according to claim 1, wherein said medium comprises one or more compounds selected from the following formulae:

Ia

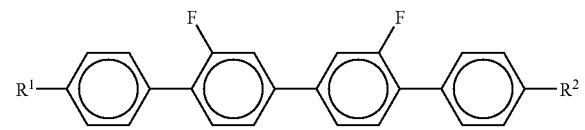

Ib

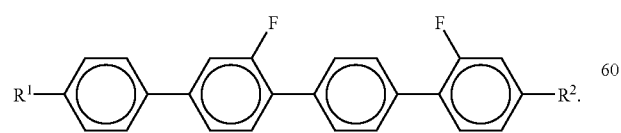

8. A liquid-crystalline medium according to claim 1, wherein said medium further comprises one or more compounds selected from the following formulae:

IV

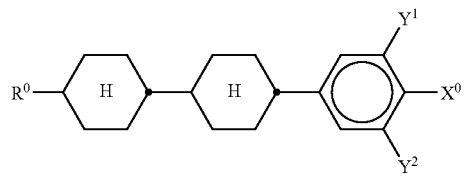

V

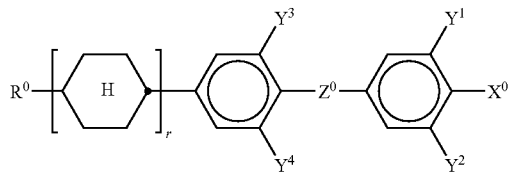

VI

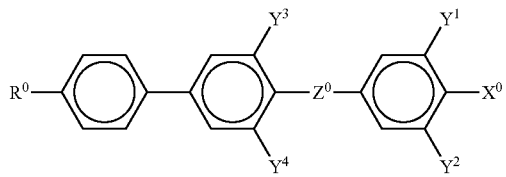

VII

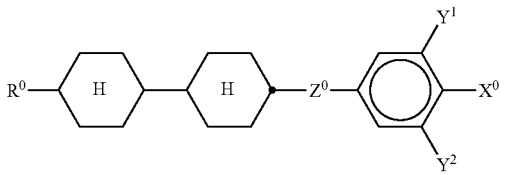

VIII

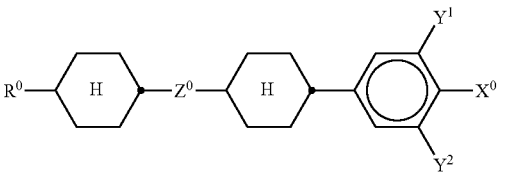

wherein $Y^{1-4}$ are each, independently of one another, H or F, $R^0$ is a halogenated or unsubstituted alkyl or alkoxy radical having 1 to 15 C atoms, where, in addition, one or more $CH_2$ groups in these radicals are each, independently of one another, be optionally replaced by —C≡C—, —$CF_2$O—, —CH=CH—,

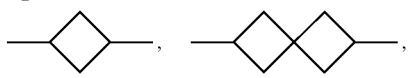

—O—, —CO—O— or —O—CO— in such a way that O atoms are not linked directly to one another, $X^0$ is F, Cl, CN, $SF_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, and $Z^0$ is —$C_2H_4$—, —$(CH_2)_4$—, —CH=CH—, —CF=CF—, —$C_2F_4$—, —$CH_2CF_2$—, —$CF_2CH_2$—, —$CH_2$O—, —O$CH_2$—, —COO— or —O$CF_2$—, in formulae V and VI also a single bond, in formulae V and VIII also —$CF_2$O—, and r is 0 or 1.

9. A liquid-crystalline medium according to claim 1, wherein said medium further comprises one or more compounds selected from the following formulae:

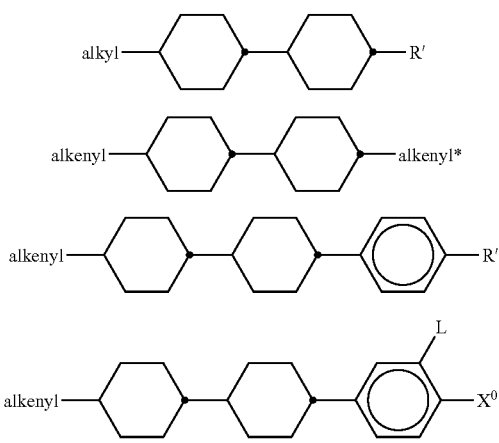

IX

X

XI

XII wherein
L is H or F,
X⁰ is F, Cl, CN, SF₅, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms,
"alkyl" is $C_{1-7}$-alkyl,
R' is $C_{1-7}$-alkyl, $C_{1-6}$-alkoxy or $C_{2-7}$-alkenyl, and
"alkenyl" and "alkenyl*" are each, independently of one another, $C_{2-7}$-alkenyl.

10. A liquid-crystalline medium comprising at least two liquid crystalline compounds, wherein said medium comprises one or more compounds of Formula I

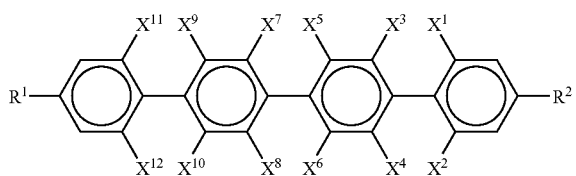

I wherein
$R^1$ and $R^2$ are each, independently of one another, a halogenated or unsubstituted alkyl or alkoxy radical having 1 to 15 C atoms, where, in addition, one or more CH₂ groups in these radicals are each, independently of one another, optionally replaced by —C≡C—, —CF₂O—, —CH=CH—,

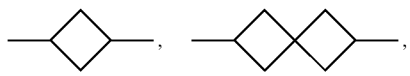

—O—, —CO—O— or —O—CO— in such a way that O atoms are not linked directly to one another, and
$X^{1-12}$ are each, independently of one another, H or F, wherein at least one of the radicals $X^{1-12}$ is F; and
said medium further comprises one or more compounds selected from the following formula:

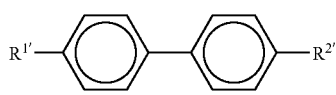

XIII wherein
$R^{1'}$ and $R^{2'}$ are each, independently of one another, a halogenated or unsubstituted alkyl or alkoxy radical having 1 to 15 C atoms, where, in addition, one or more CH₂ groups in these radicals are each, independently of one another, be optionally replaced by —C≡C—, —CF₂O—, —CH=CH—,

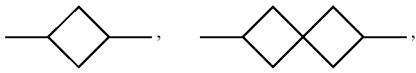

—O—, —CO—O— or —O—CO— in such a way that O atoms are not linked directly to one another, and
at least one of $R^{1'}$ and $R^{2'}$ is alkenyl having 2 to 7 C atoms.

11. A liquid-crystalline medium according to claim 1, wherein said medium further comprises one or more compounds of the following formula:

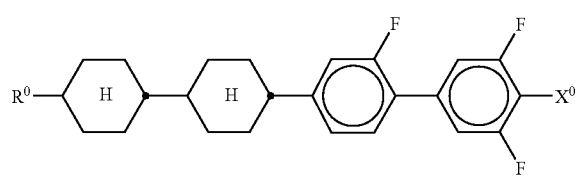

XXIa wherein
$R^0$ is a halogenated or unsubstituted alkyl or alkoxy radical having 1 to 15 C atoms, where, in addition, one or more CH₂ groups in these radicals are may each, independently of one another, optionally replaced by —C≡C—, —CF₂O—, —CH=CH—,

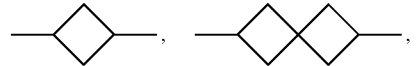

—O—, —CO—O— or —O—CO— in such a way that O atoms are not linked directly to one another, and
X⁰ is F, Cl, CN, SF₅, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms.

12. A liquid-crystalline medium according to claim 1, wherein said medium further comprises one or more compounds of the following formulae:

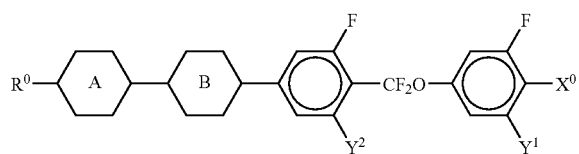

XV

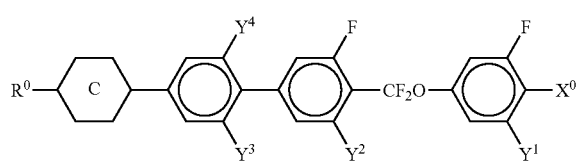

XVI wherein
$Y^{1-4}$ are each, independently of one another, H or F,
$R^0$ is a halogenated or unsubstituted alkyl or alkoxy radical having 1 to 15 C atoms, where, in addition, one or more CH$_2$ groups in these radicals are each, independently of one another, be optionally replaced by —C≡C—, —CF$_2$O—, —CH=CH—,

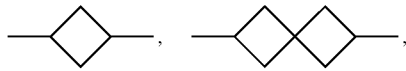

—O—, —CO—O— or —O—CO— in such a way that O atoms are not linked directly to one another, X$^0$ is F, Cl, CN, SF$_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms,

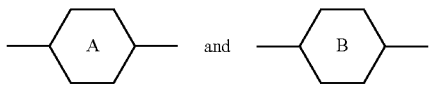

are each, independently of one another,

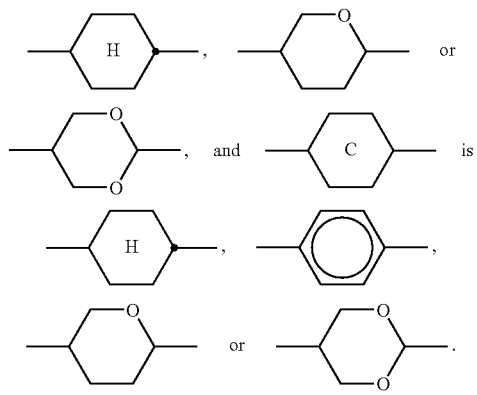

13. A liquid-crystalline medium according to claim 1, wherein said medium further comprises one or more compounds of the following formula:

XVII

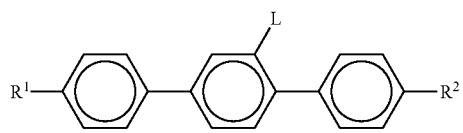

wherein L is H or F, and

R$^1$ and R$^2$ are each, independently of one another, a halogenated or unsubstituted alkyl or alkoxy radical having 1 to 15 C atoms, where, in addition, one or more CH$_2$ groups in these radicals are each, independently of one another, optionally replaced by —C≡C—, —CF$_2$O—, —CH=CH—,

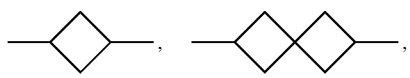

—O—, —CO—O— or —O—CO— in such a way that O atoms are not linked directly to one another.

14. A liquid-crystalline medium according to claim 1, wherein said medium further comprises one or more compounds selected from the following formulae:

XIX

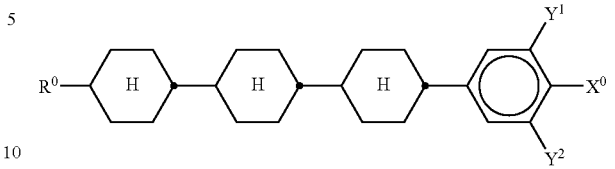

XX

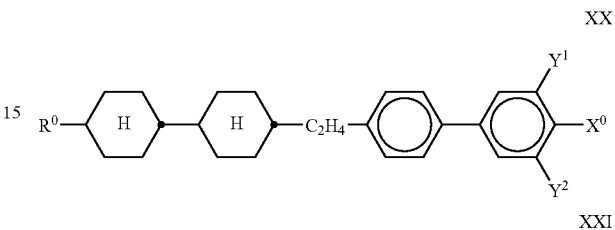

XXI

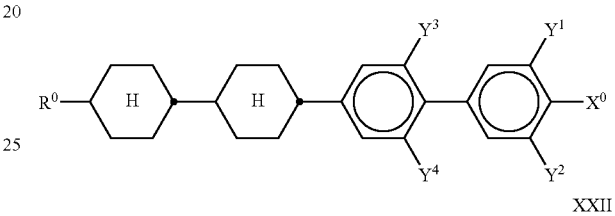

XXII

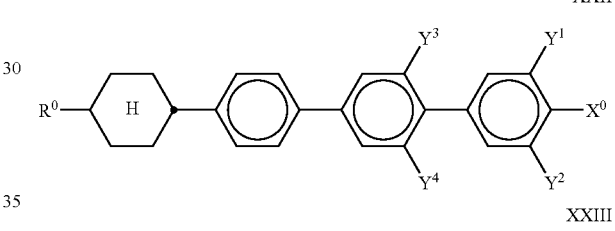

XXIII

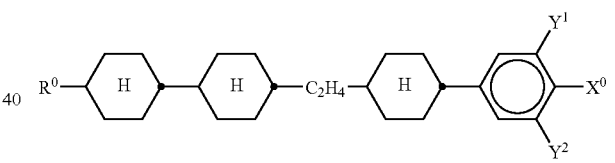

wherein

R$^0$ is a halogenated or unsubstituted alkyl or alkoxy radical having 1 to 15 C atoms, where, in addition, one or more CH$_2$ groups in these radicals are each, independently of one another, optionally replaced by —C≡C—, —CF$_2$O—, —CH=CH—,

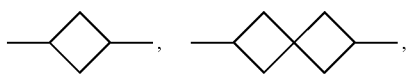

—O—, —CO—O— or —O—CO— in such a way that O atoms are not linked directly to one another, X$^0$ is F, Cl, CN, SF$_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, and Y$^{1-4}$ are each, independently of one another, H or F.

15. A liquid-crystalline medium according to claim 1, wherein said medium further comprises one or more compounds selected from the following formula:

XXIV

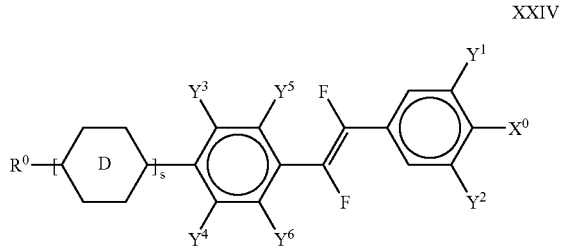

wherein $R^0$ is a halogenated or unsubstituted alkyl or alkoxy radical having 1 to 15 C atoms, where, in addition, one or more $CH_2$ groups in these radicals are each, independently of one another, optionally replaced by —C≡C—, —$CF_2$O—, —CH=CH—,

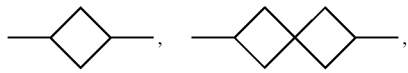

—O—, —CO—O— or —O—CO— in such a way that O atoms are not linked directly to one another, $X^0$ is F, Cl, CN, $SF_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, $Y^{1-6}$ are each, independently of one another, H or F, and

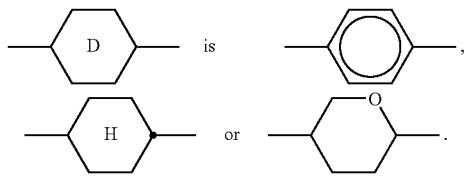

16. A method of generating by applying a voltage to a liquid-crystal display containing a liquid-crystalline medium as a dielectric, wherein said medium is a liquid-crystalline medium according to claim 1.

17. An electro-optical liquid-crystal display comprising two plane-parallel outer plates, which, together with a frame, form a cell, integrated non-linear elements for switching individual pixels on said outer plates, and a nematic liquid-crystal medium, wherein said medium is a liquid-crystalline medium according to claim 1.

18. A display according to claim 17, wherein said display is an STN display.

19. A display according to claim 17, wherein said display is an MCL display.

20. A process for preparation of a liquid-crystalline medium according to claim 1, comprising: mixing one or more compounds of the formula with one or more further liquid-crystalline compounds and/or additives.

21. A liquid-crystalline medium according to claim 8, wherein said medium further comprises one or more compounds selected from the following formulae:

IX

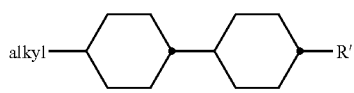

-continued

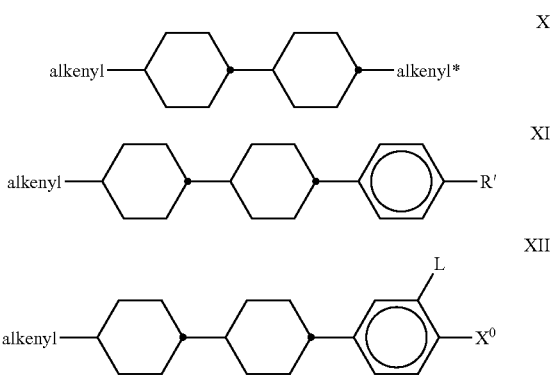

wherein

L is H or F, $X^0$ is F, Cl, CN, $SF_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, "alkyl" is $C_{1-7}$-alkyl, R' is $C_{1-7}$-alkyl, $C_{1-6}$-alkoxy or $C_{2-7}$-alkenyl, and "alkenyl" and "alkenyl*" are each, independently of one another, $C_{2-7}$-alkenyl; and said medium further comprises one or more compounds selected from the following formulae:

XIX

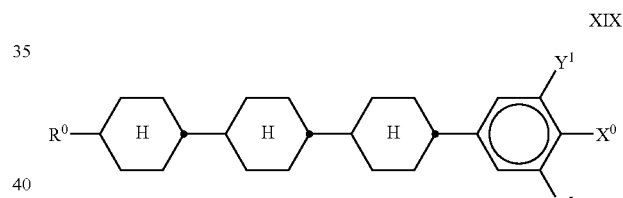

XX

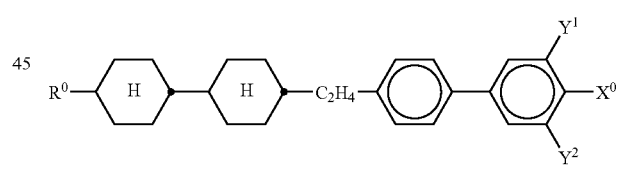

XXI

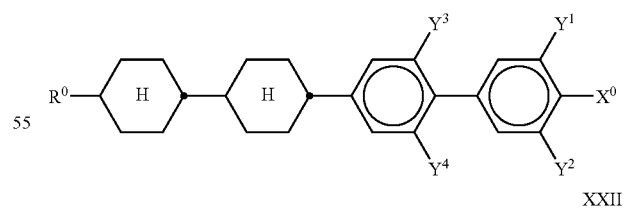

XXII

XXIII

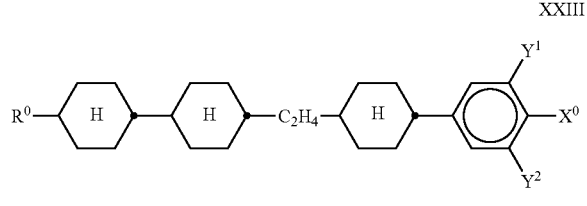

wherein
- $R^0$ is a halogenated or unsubstituted alkyl or alkoxy radical having 1 to 15 C atoms, where, in addition, one or more $CH_2$ groups in these radicals are each, independently of one another, optionally replaced by —C≡C—, —$CF_2$O—, —CH=CH—,

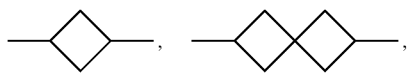

—O—, —CO—O— or —O—CO— in such a way that O atoms are not linked directly to one another,
- $X^0$ is F, Cl, CN, $SF_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, and
- $Y^{1-4}$ are each, independently of one another, H or F.

22. A liquid-crystalline medium according to claim 21, wherein said medium comprises:
- 1-30% by weight of compounds of the formula I,
- 10-50% by weight of compounds of the formulae II and/or III,
- 20-70% by weight of compounds of the formulae IX-XII,
- 4-30% by weight of compounds of the formula IV,
- 2-30% by weight of compounds of the formula VI, and
- 2-30% by weight of compounds of the formula XXI.

23. A liquid-crystalline medium according to claim 1, wherein said medium further comprises one or more compounds selected from the following formula:

XIII

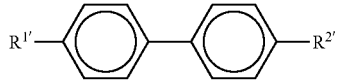

wherein
- $R^{1\prime}$ and $R^{2\prime}$ are each, independently of one another, a halogenated or unsubstituted alkyl or alkoxy radical having 1 to 15 C atoms, where, in addition, one or more $CH_2$ groups in these radicals are each, independently of one another, optionally replaced by —C≡C—, —$CF_2$O—, —CH=CH—

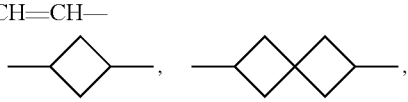

—O—, —CO—O— or —O—CO— in such a way that O atoms are not linked directly to one another, and
at least one of $R^{1\prime}$ and $R^{2\prime}$ is alkenyl having 2 to 7 C atoms.

24. A liquid-crystalline medium comprising at least two liquid crystalline compounds, wherein said medium comprises one or more compounds of Formula I

I

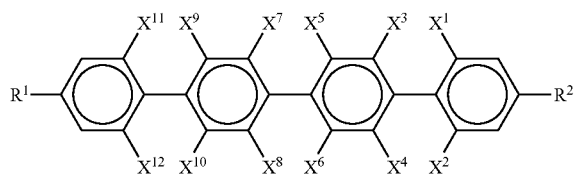

wherein
- $R^1$ and $R^2$ are each, independently of one another, a halogenated or unsubstituted alkyl or alkoxy radical having 1 to 15 C atoms, where, in addition, one or more $CH_2$ groups in these radicals are each, independently of one another, optionally replaced by —C≡C—, —$CF_2$O—, —CH=CH—,

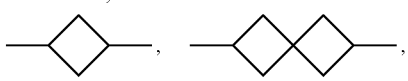

—O—, —CO—O— or —O—CO— in such a way that O atoms are not linked directly to one another, and
- $X^2$, $X^4$, $X^6$, $X^8$, $X^{10}$ and $X^{12}$ are each H,
- $X^1$, $X^3$, $X^5$, $X^7$, $X^9$ and $X^{11}$ are each, independently of one another, H or F,
- one or two of the radicals $X^1$, $X^5$ and $X^9$ is F and one or two of the radicals $X^3$, $X^7$ and $X^{11}$ is F,
- $X^3$ and $X^5$ are not simultaneously F, and
- $X^7$ and $X^9$ are not simultaneously F; and
wherein said medium further comprises one or more compounds selected from the following formulae:

IV

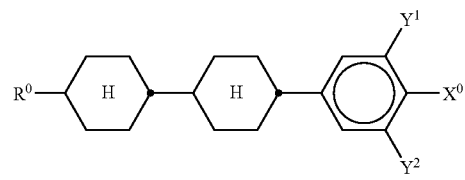

V

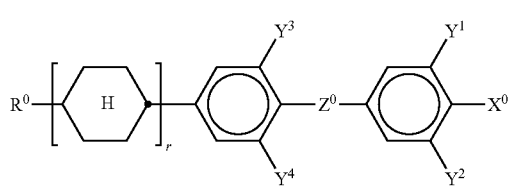

VI

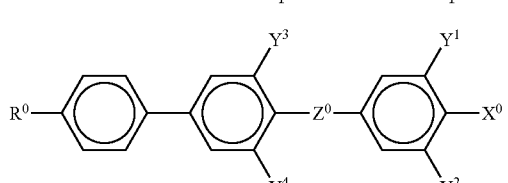

VII

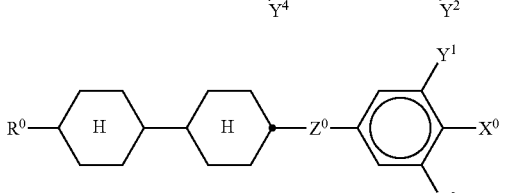

-continued

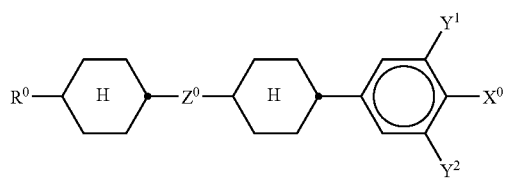
VIII wherein
$Y^{1-4}$ are each, independently of one another, H or F,
$R^0$ is a halogenated or unsubstituted alkyl or alkoxy radical having 1 to 15 C atoms, where, in addition, one or more $CH_2$ groups in these radicals are each, independently of one another, optionally replaced by —C≡C—, —$CF_2$O—, —CH=CH—,

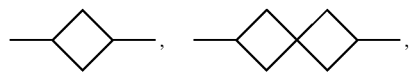,

—O—, —CO—O— or —O—CO— in such a way that O atoms are not linked directly to one another,
$X^0$ is F, Cl, CN, $SF_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms, and
$Z^0$ is —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_2O$—, and
r is 0 or 1.

25. A liquid-crystalline medium according to claim 24, wherein one of the radicals $X^1$, $X^5$ and $X^9$ is F, and one of the radicals $X^3$, $X^7$ and $X^{11}$ is F, where these radicals are not located on the same phenyl ring.

26. A liquid-crystalline medium according to claim 24, wherein said medium further comprises one or more compounds selected from the following formulae:

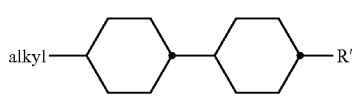
IX

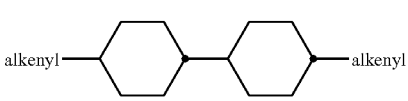
X

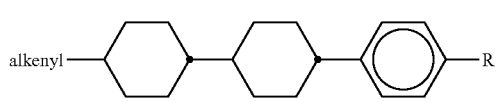
XI

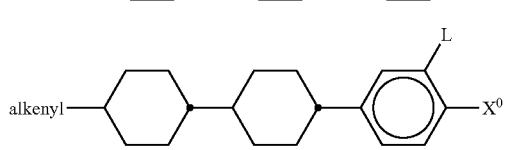
XII wherein
L is H or F,
$X^0$ is F, Cl, CN, $SF_5$, SCN, NCS, halogenated alkyl having up to 6 C atoms, halogenated alkenyl having up to 6 C atoms, halogenated alkoxy having up to 6 C atoms, or halogenated alkenyloxy having up to 6 C atoms,
"alkyl" is $C_{1-7}$-alkyl,
R' is $C_{1-7}$-alkyl, $C_{1-6}$-alkoxy or $C_{2-7}$-alkenyl, and
"alkenyl" and "alkenyl*" are each, independently of one another, $C_{2-7}$-alkenyl.

27. A liquid-crystalline medium according to claim 26, wherein one of the radicals $X^1$, $X^5$ and $X^9$ is F, and one of the radicals $X^3$, $X^7$ and $X^{11}$ is F, where these radicals are not located on the same phenyl ring.

* * * * *

UNITED STATES PATENT AND TRADEMARK OFFICE
CERTIFICATE OF CORRECTION

PATENT NO.        : 7,678,432 B2                                         Page 1 of 1
APPLICATION NO. : 11/907326
DATED             : March 16, 2010
INVENTOR(S)       : Wittek et al.

It is certified that error appears in the above-identified patent and that said Letters Patent is hereby corrected as shown below:

Column 36, line 23 reads: "groups in these radicals are may each, independently of" should read: -- groups in these radicals are each, independently of --

Column 38, line 46 reads: "one another, be optionally replaced by -C≡C-" should read: -- one another, optionally replaced by -C≡C- --

Column 40, line 6 reads: "another, be optionally replaced by -C≡C-," should read: -- another, optionally replaced by -C≡C-, --

Column 40, line 32 reads: "$CH_2$ groups in these radicals are may each, indepen-" should read: -- $CH_2$ groups in these radicals are each, indepen- --

Signed and Sealed this

Twenty-sixth Day of October, 2010

David J. Kappos
*Director of the United States Patent and Trademark Office*